(12) United States Patent
Fukase et al.

(10) Patent No.: US 10,558,053 B2
(45) Date of Patent: Feb. 11, 2020

(54) OPTICAL DEVICE AND DISPLAY APPARATUS

(71) Applicant: SEIKO EPSON CORPORATION, Tokyo (JP)

(72) Inventors: Akio Fukase, Chino (JP); Kunihiko Yano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/988,589

(22) Filed: May 24, 2018

(65) Prior Publication Data

US 2018/0348532 A1 Dec. 6, 2018

(30) Foreign Application Priority Data

Jun. 1, 2017 (JP) .................. 2017-109013

(51) Int. Cl.
*G02B 27/10* (2006.01)
*G02B 27/01* (2006.01)

(52) U.S. Cl.
CPC ....... *G02B 27/102* (2013.01); *G02B 27/0172* (2013.01); *G02B 2027/0114* (2013.01); *G02B 2027/0125* (2013.01)

(58) Field of Classification Search
CPC .............. G02B 27/0081; G02B 27/102; G02B 27/149; G02B 27/0172; G02B 27/1026; G02B 2027/0114; G02B 2027/0125; H01L 51/0084; H01L 51/0085; H01L 51/0086; H01L 51/0087; H01L 51/0088; H01L 51/0089; H01L 51/009; H01L 51/00921; H01L 51/0092
See application file for complete search history.

(56) References Cited

U.S. PATENT DOCUMENTS

| | | | |
|---|---|---|---|
| 2004/0021833 A1 | 2/2004 | Koide | |
| 2004/0189187 A1* | 9/2004 | Chang | H01L 51/5281 313/503 |
| 2006/0209219 A1* | 9/2006 | Koide | G03B 21/14 349/5 |
| 2006/0215129 A1* | 9/2006 | Alasaarela | G02B 27/102 353/94 |
| 2008/0030434 A1* | 2/2008 | Yamazaki | G09G 3/3258 345/76 |
| 2014/0347736 A1* | 11/2014 | Liu | G02B 27/0172 359/630 |
| 2015/0144908 A1* | 5/2015 | Yoon | H01L 27/3216 257/40 |
| 2016/0240590 A1* | 8/2016 | Liu | H01L 51/5221 |
| 2018/0157053 A1* | 6/2018 | Richards | G02B 6/0073 |

FOREIGN PATENT DOCUMENTS

| | | |
|---|---|---|
| JP | H06-141262 A | 5/1994 |
| JP | 2000-066301 A | 3/2000 |
| JP | 2004-062108 A | 2/2004 |

* cited by examiner

*Primary Examiner* — Sultan Chowdhury
(74) *Attorney, Agent, or Firm* — Oliff PLC

(57) ABSTRACT

An optical device combines light emitted from first and second display panels. The first display panel emits first color light from a plurality of pixels. The second display panel emits second color light having a different wavelength range from the first color light from a plurality of pixels and emits third color light having a different wavelength range from the second color light from a plurality of pixels.

20 Claims, 18 Drawing Sheets

OPTICAL DEVICE AND DISPLAY APPARATUS

BACKGROUND

1. Technical Field

The present invention relates to optical devices and display apparatuses.

2. Related Art

JP-A-2000-066301 and JP-A-2004-062108 propose projection display apparatuses including three display panels having light-emitting elements such as electroluminescent elements (e.g., organic electroluminescent elements) in individual pixels and a dichroic prism. Color light emitted from each of the three display panels is combined by the dichroic prism and is then projected through a projection optical system.

JP-A-6-141262 proposes a propose projection display apparatus including a display panel composed of a liquid crystal panel that emits blue light from individual pixels, a display panel having light-emitting diodes that emit red light in some pixels and light-emitting diodes that emit green light in other pixels, and a dichroic prism. Color light emitted from each of the two display panels is combined by the dichroic prism and is then projected through a projection optical system.

The display apparatuses disclosed in JP-A-2000-066301 and JP-A-2004-062108 include three display panels and therefore require wiring lines and a drive substrate for each of the three display panels. Since these display apparatuses include three display panels, these display apparatuses also take much time and effort to assemble. This makes it difficult to achieve a reduction in size and cost. The display apparatus disclosed in JP-A-6-141262 includes a liquid crystal panel and therefore requires a light source. This makes it difficult to achieve a reduction in size and cost.

SUMMARY

An advantage of some aspects of the invention is to provide an optical device and a display apparatus that can provide a bright color image and that are suitable for size and cost reduction.

An optical device according to an aspect of the invention includes a first display panel having a plurality of first pixels, each including a first light-emitting element. The first display panel emits first color light from each of the plurality of first pixels. The optical device further includes a second display panel having a plurality of second pixels, each including a second light-emitting element, and a plurality of third pixels, each including a third light-emitting element. The second display panel emits second color light having a different wavelength range from the first color light from each of the plurality of second pixels and emits third color light having a different wavelength range from the first color light and the second color light from each of the plurality of third pixels. The optical device further includes a combining optical system that combines the light emitted from the first display panel and the light emitted from the second display panel.

Since the combining optical system combines the color light emitted from the plurality of display panels, the optical device according to this aspect can provide a bright color image. In addition, since the combining optical system combines the first color light emitted from the first display panel and the second color light and the third color light emitted from the second display panel, only two display panels are required. Thus, assembly can be efficiently performed. In addition, since both the first display panel and the second display panel are display panels including light-emitting elements, these display panels, unlike liquid crystal panels, do not require a component such as a light source. Thus, the optical device according to this aspect, when used in a display apparatus, can provide a bright color image and also contributes to a reduction in the size and cost of the display apparatus.

It is preferable that the first light-emitting elements, the second light-emitting elements, and the third light-emitting elements be organic electroluminescent elements.

It is preferable that the first color light have a shorter peak wavelength than the second color light and the third color light. In general, a display panel that emits a shorter wavelength tends to have a shorter life than a display panel that emits a longer wavelength when driven under the same conditions. Accordingly, if the first display panel, which emits one color of light, emits light with a shorter wavelength, the load on the first display panel can be reduced even if the first color light, the second color light, and the third color light have the same luminance. This extends the life of the first display panel.

It is preferable that the first light-emitting elements emit light via one of a singlet exciton and a triplet exciton and the second light-emitting elements and the third light-emitting elements emit light via the other exciton. This facilitates the use of a common material in the steps of forming the second light-emitting elements and the third light-emitting elements.

It is preferable that the difference in peak wavelength between the second color light and the third color light be smaller than the difference in peak wavelength between the first color light and the second color light and the difference in peak wavelength between the first color light and the third color light. In this case, for example, the combining optical system performs one of transmission and reflection on the first color light and performs the other on the second color light and the third color light, which have closer wavelengths. This facilitates proper design of a component such as a dichroic mirror used in the combining optical system and also facilitates optimization of the optical characteristics of a component such as a dichroic mirror, thus reducing light intensity loss.

It is preferable that the combining optical system include a dichroic mirror that transmits the first color light and that reflects the second color light and the third color light. It is preferable that the combining optical system include a dichroic mirror that reflects the first color light and that transmits the second color light and the third color light.

It is preferable that the combining optical system include a first dichroic mirror that reflects the first color light and that transmits the second color light and the third color light and a second dichroic mirror that transmits the first color light and that reflects the second color light and the third color light.

It is preferable that the second pixels and the third pixels have a larger size than the first pixels. This improves the luminance of the second color light and the third color light without applying a considerable load to the second light-emitting elements and the third light-emitting elements.

The optical device according to this aspect may be used in a display apparatus including a light guide system that guides the light output from the combining optical system and that outputs the light toward a surface of a viewer.

The optical device according to this aspect may be used in a display apparatus including a projection optical system that projects the light output from the combining optical system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
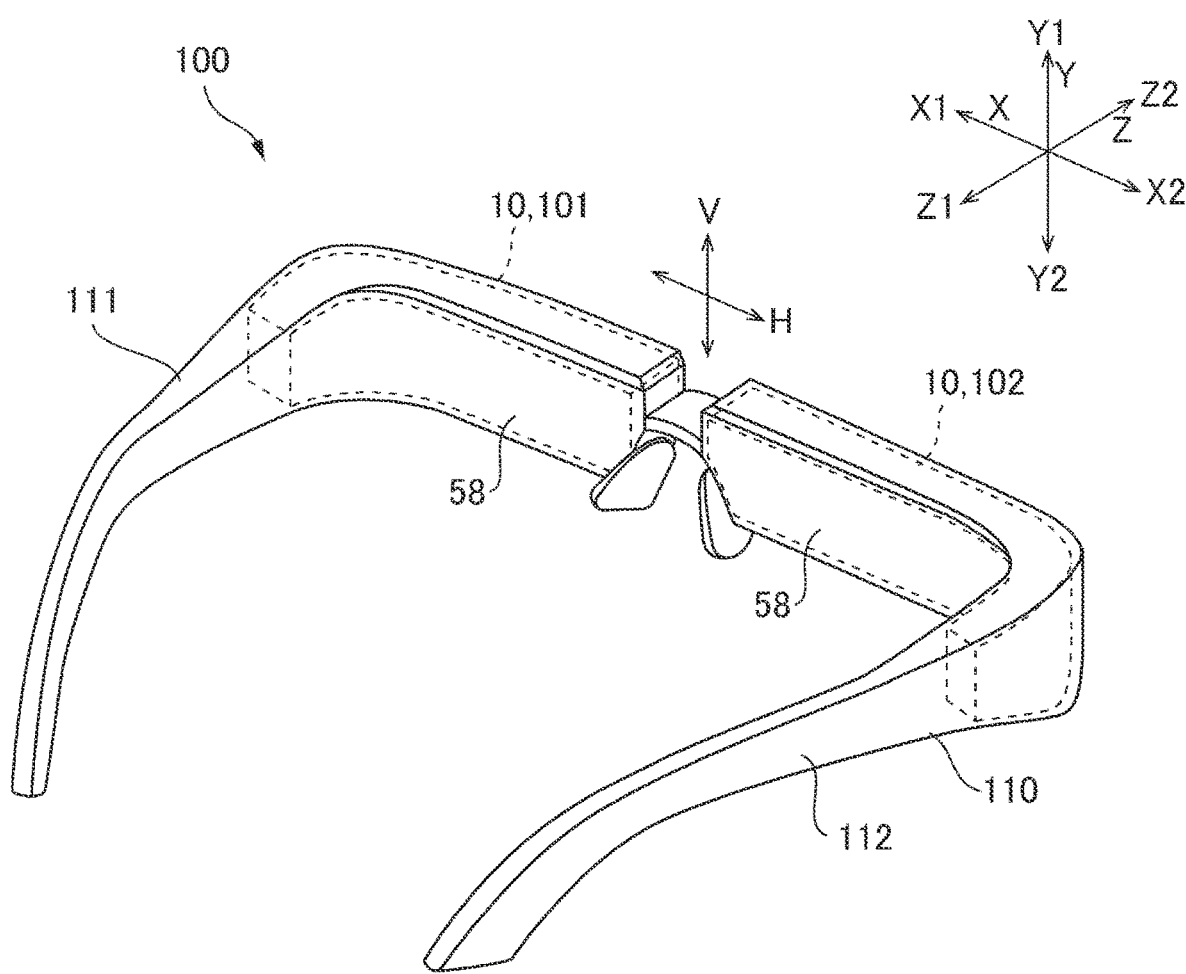
FIG. 1 is a schematic illustration of an example of the external appearance of a display apparatus according to a first embodiment of the invention.

Embodiments of the invention will now be described. The number and scale of layers and members in the drawings to which reference is made in the following description are varied so that the layers and the members have visible sizes in the drawings.

First Embodiment

Overall Configuration

FIG. 1 is a schematic illustration of an example of the external appearance of a display apparatus 100 according to a first embodiment of the invention. The display apparatus 100 shown in FIG. 1 is configured as a head-mounted display apparatus such as a see-through eyeglass display and includes a frame 110 having left and right temples 111 and 112. The display apparatus 100 includes display units 10, described later, that are supported by the frame 110 and allows a user to perceive an image output from the display units 10 as a virtual image. In this embodiment, the display apparatus 100 includes, as the display units 10, a display unit 101 for the left eye and a display unit 102 for the right eye. The display unit 101 for the left eye and the display unit 102 for the right eye have the same configuration and are arranged laterally symmetrically.

In the following description, the display unit 101 for the left eye will be mainly described, and a description of the display unit 102 for the right eye is omitted. In the following description, the left/right direction corresponds to a first direction X, the front/rear direction corresponds to a second direction Z, and the top/bottom direction corresponds to a third direction Y. One side (left side) in the first direction X is indicated by X1, whereas the other side (right side) in the first direction X is indicated by X2. One side (rear side) in the second direction Z is indicated by Z1, whereas the other side (front side) in the second direction Z is indicated by Z2. One side (top side) in the third direction Y is indicated by Y1, whereas the other side (bottom side) in the third direction Y is indicated by Y2. Since the display unit 101 for the left eye and the display unit 102 for the right eye are symmetrically arranged, the display unit 101 for the left eye and the display unit 102 for the right eye are laterally inverted relative to each other on the one side X1 and the other side X2 in the first direction X.

Overall Configuration of Display Units 10

Figure 2:
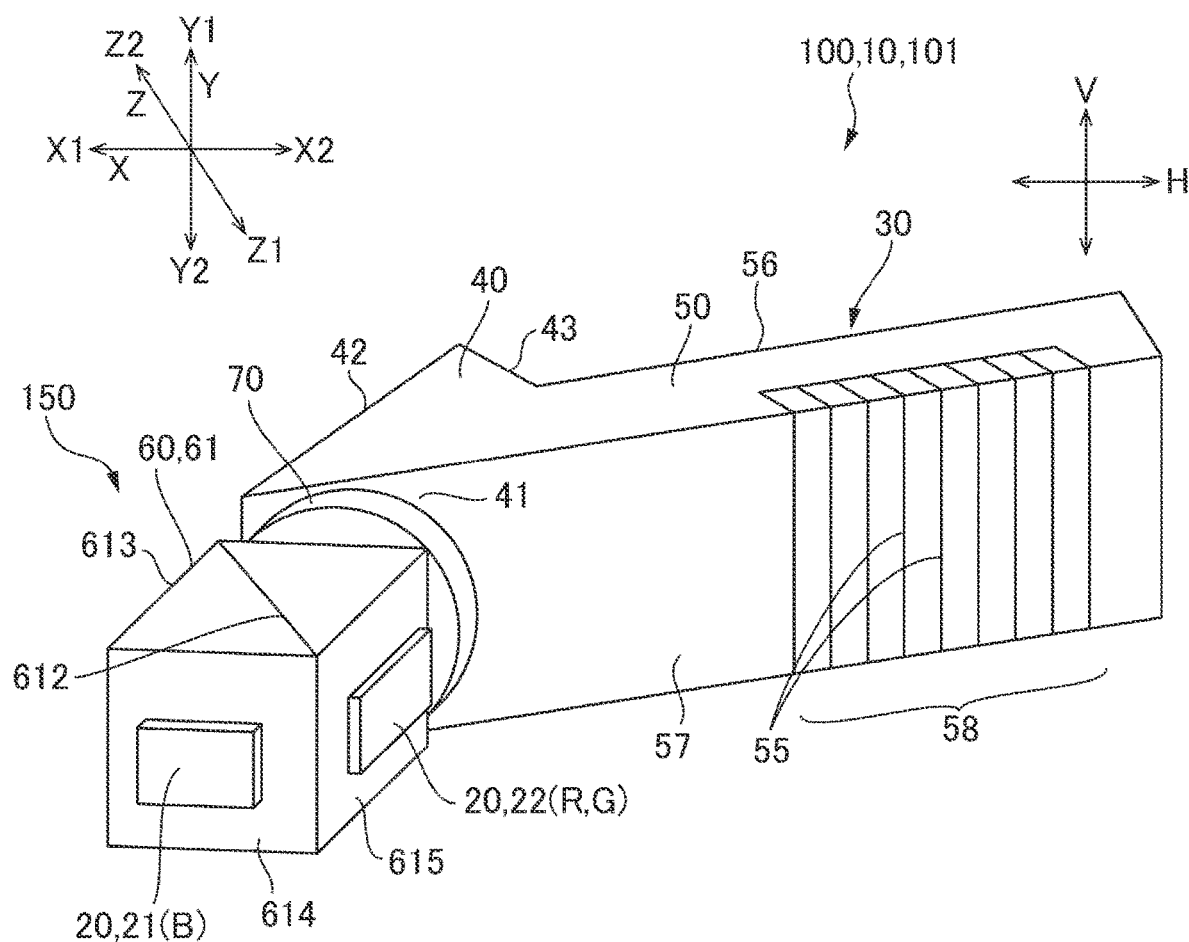
FIG. 2 is a schematic perspective view of the configuration of the optical system of a display unit shown in FIG. 1.
Figure 3:
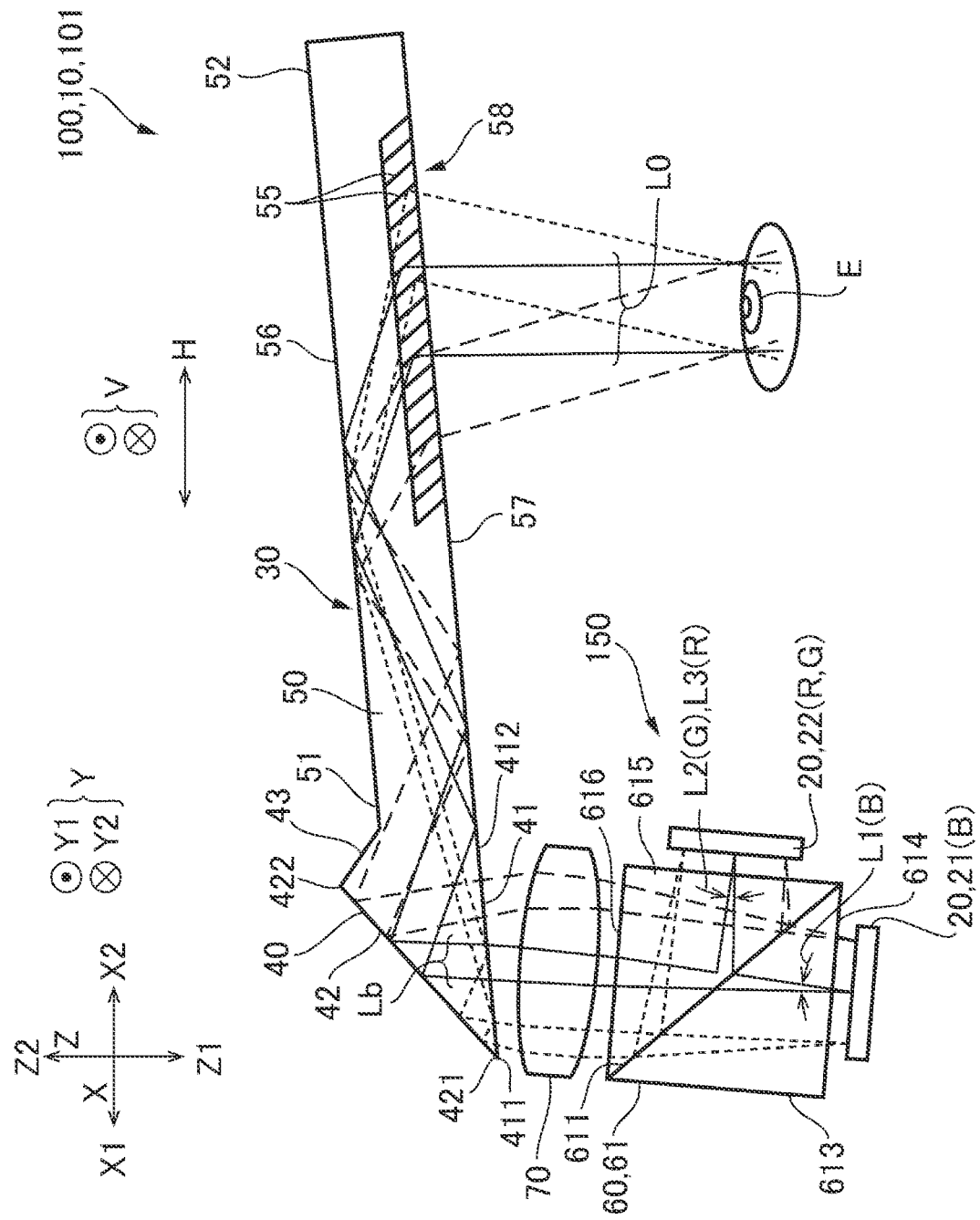
FIG. 3 is a plan view of the display unit shown in FIG. 2 as viewed in a third direction.

FIG. 2 is a schematic perspective view of the configuration of the optical system of a display unit 10 shown in FIG. 1. FIG. 3 is a plan view of the display unit 10 shown in FIG. 2 as viewed in the third direction Y. In FIGS. 2 and 3, portions corresponding to red light, green light, and blue light are indicated by (R), (G), and (B), respectively. Of the rays of color light L emitted from each display panel 20, only effective rays incident on a viewer's eye E as image light L0 are shown. The effective rays emitted from the pixels in the center of the display panel 20 are indicated by the solid lines. The effective rays emitted from the pixels at one end of the display panel 20 are indicated by the long-dashed lines. The effective rays emitted from the pixels at the other end of the display panel 20 are indicated by the dotted lines.

As shown in FIGS. 2 and 3, each of the display units 10 (display unit 101) of the display apparatus 100 includes an optical device 150 that combines a plurality of colors of light to output combined light Lb and a light guide system 30 that guides the combined light Lb output from the optical device 150 to an exit section 58. The optical device 150 includes a plurality of display panels 20 and a combining optical system 60 that combines the color light emitted from the plurality of display panels 20. The display apparatus 100 includes a projection lens system 70 between the combining optical system 60 and the light guide system 30. The combined light Lb output from the combining optical system 60 passes through the projection lens system 70 and enters the light guide system 30. The projection lens system 70 is composed of a single collimating lens having positive power.

The light guide system 30 includes a light-transmissive entrance section 40 through which the combined light Lb enters and a light-transmissive light guide section 50 having one end 51 in the first direction X coupled to the entrance section 40. In this embodiment, the entrance section 40 and the light guide section 50 are configured as a one-piece light-transmissive member.

The entrance section 40 has an entrance surface 41 through which the combined light Lb output from the combining optical system 60 enters and a reflective surface 42 that reflects the combined light Lb entering through the entrance surface 41 toward the entrance surface 41. The entrance surface 41 is composed of a surface such as a flat surface, an aspherical surface, or a free-form surface facing the one side Z1 in the second direction Z and is located opposite the combining optical system 60 with the projection lens system 70 therebetween. The projection lens system 70 is inclined such that the distance between the projection lens system 70 and the end 412 of the entrance surface 41 on the other side X2 in the first direction X is larger than the distance between the projection lens system 70 and the end 411 of the entrance surface 41 on the one side X1 in the first direction X. Although the entrance surface 41 does not have, for example, a reflective film formed thereon, the entrance surface 41 totally reflects light incident at an incident angle greater than the critical angle. Thus, the entrance surface 41 is transmissive and reflective. The reflective surface 42 is composed of a surface located on the other side Z2 in the second direction Z relative to the entrance surface 41 and is inclined such that the end 422 of the reflective surface 42 on the other side X2 in the first direction X is farther away from the entrance surface 41 than the end 421 of the reflective surface 42 on the one side X1 in the first direction X. Thus, the entrance section 40 is substantially triangular as viewed in the third direction Y. The reflective surface 42 is composed of a surface such as a flat surface, an aspherical surface, or a free-form surface. The reflective surface 42 may be configured to totally reflect light incident at an incident angle greater than the critical angle without having, for example, a reflective film formed thereon. Alternatively, the reflective surface 42 may have formed thereon a reflective metal layer mainly containing a metal such as aluminum, silver, magnesium, or chromium.

The light guide section 50 has a first surface 56 (first reflective surface) extending from one end 51 (the end on the one side X1) to the other end 52 (the end on the other side X2) in the first direction X, a second surface 57 (second reflective surface) located on the one side Z1 in the second direction Z relative to the first surface 56 and extending from the one end 51 to the other end 52 in the first direction X parallel to and opposite the first surface 56, and the exit section 58, which is disposed in the portion of the second surface 57 remote from the entrance section 40. The first surface 56 and the reflective surface 42 of the entrance section 40 are joined by an inclined surface 43. The thickness between the first surface 56 and the second surface 57 in the second direction Z (the size of the light guide section 50 in the second direction Z) is smaller than the size of the entrance section 40 in the second direction Z. Based on the difference in refractive index between the light guide section 50 and the outside (air), the first surface 56 and the second surface 57 totally reflect light incident at an incident angle greater than the critical angle. Thus, the first surface 56 and the second surface 57 do not have, for example, a reflective film formed thereon.

The exit section 58 is formed in a portion of the light guide section 50 on the second surface 57 side in the thickness direction. In the exit section 58, a plurality of partially reflective surfaces 55 are arranged parallel to each other in the first direction X. As viewed in the third direction Y, the partially reflective surfaces 55 are tilted toward the one side X1 in the first direction X with respect to the direction normal to the second surface 57. The exit section 58 is a portion of the second surface 57 that extends over the plurality of partially reflective surfaces 55 in the first direction X and is a region having a predetermined width in the first direction X. The plurality of partially reflective surfaces 55 are each formed of a dielectric multilayer film. Alternatively, at least one of the plurality of partially reflective surfaces 55 may be formed of a composite layer of a dielectric multilayer film and a reflective metal layer (thin film) mainly containing a metal such as aluminum, silver, magnesium, or chromium. If the partially reflective surfaces 55 include a metal layer, the metal layer is effective in improving the reflectance of the partially reflective surfaces 55 and optimizing the incident angle dependence and polarization dependence of the transmittance and reflectance of the partially reflective surfaces 55. The exit section 58 may include an optical element such as a diffraction grating or a hologram.

Configuration of Optical Device 150

Figure 4:
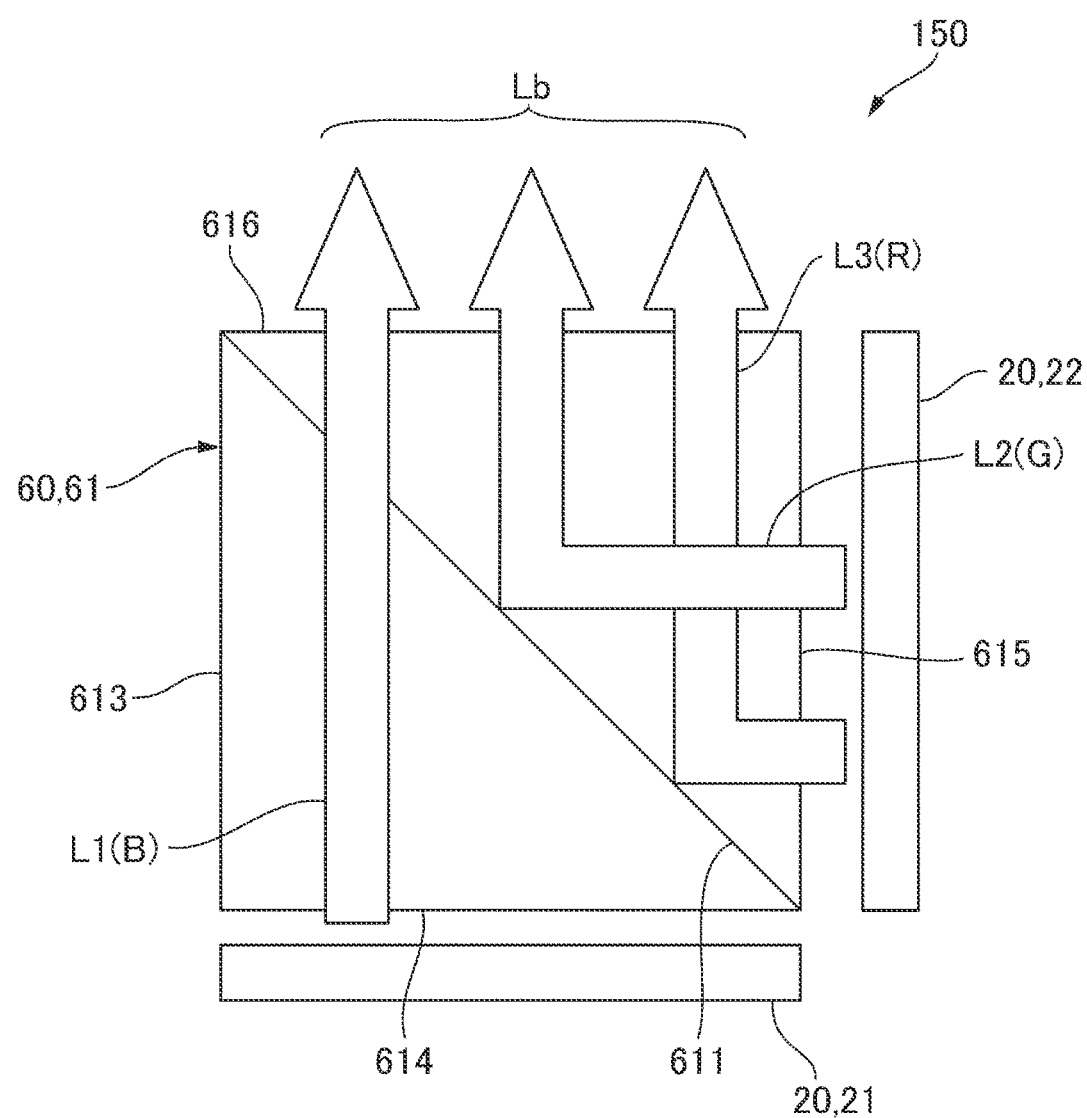
FIG. 4 is an illustration of an optical device shown in figures such as FIG. 2 as viewed in the third direction.
Figure 5A:
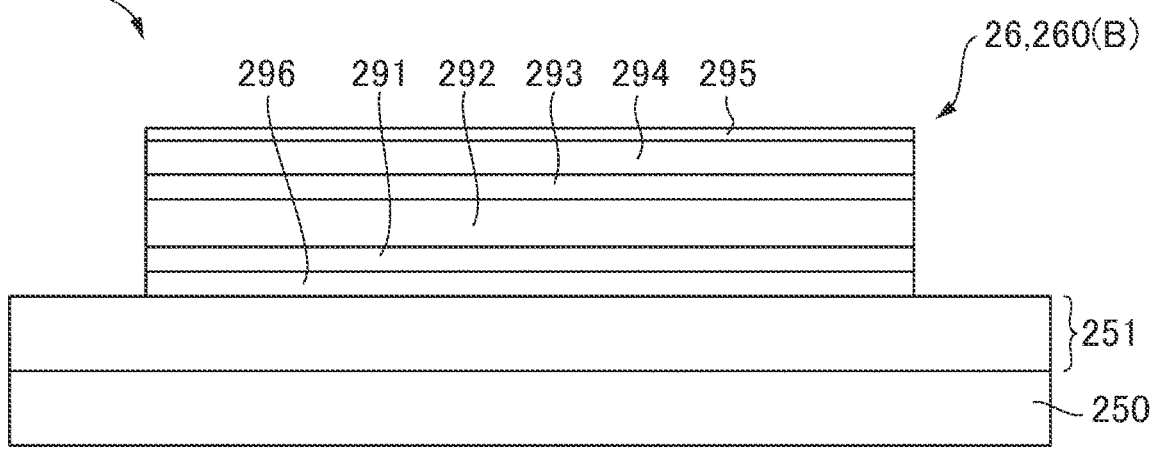
FIGS. 5A and 5B are illustrations of display panels shown in FIG. 4.
Figure 5B:
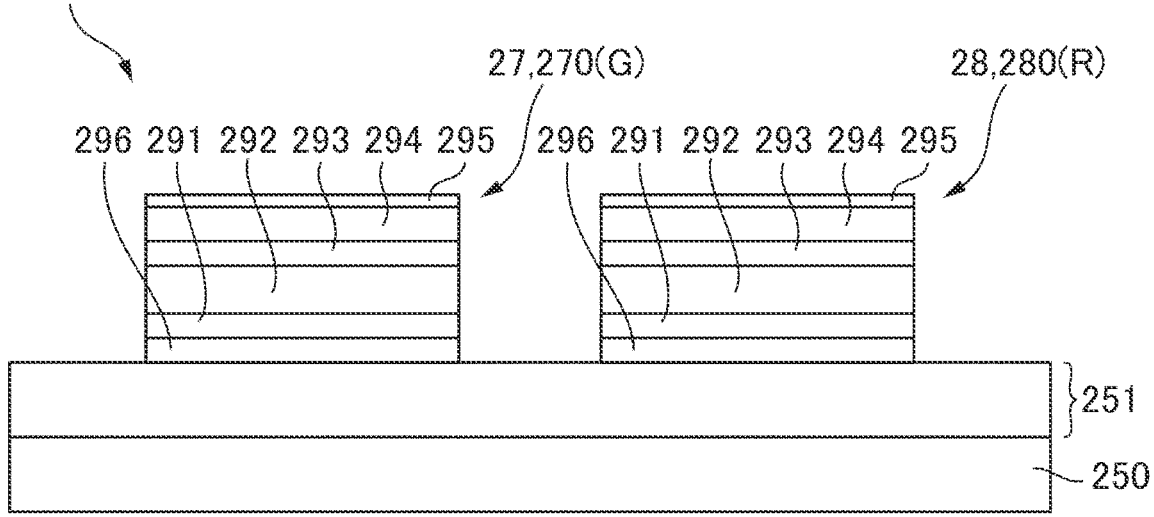
Figure 6:
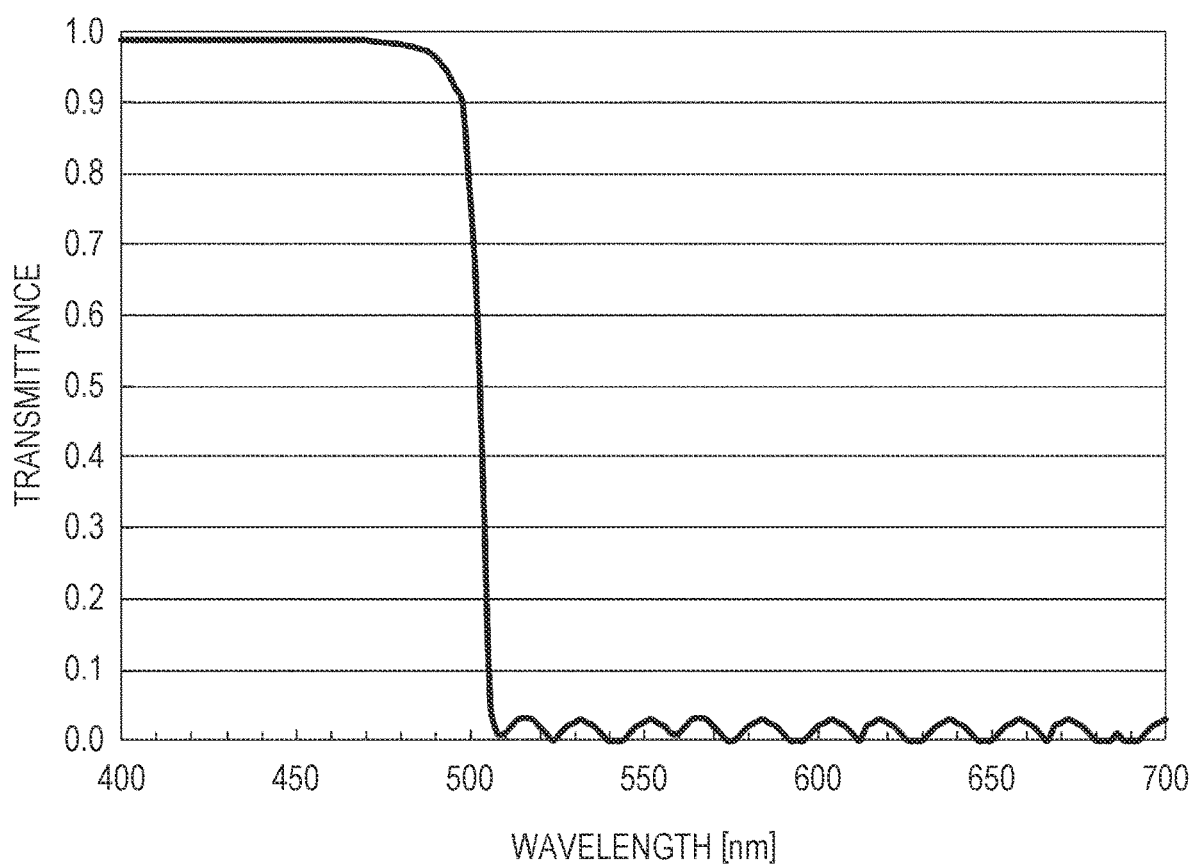
FIG. 6 is a graph showing the transmittance-wavelength characteristics of a dichroic mirror used in a combining optical system shown in figures such as FIG. 2.

FIG. 4 is an illustration of the optical device 150 shown in figures such as FIG. 2 as viewed in the third direction Y. FIGS. 5A and 5B are illustrations of the display panels 20 shown in FIG. 4. FIG. 5A schematically shows the configuration of a first display panel 21. FIG. 5B schematically shows the configuration of a second display panel 22. FIG. 6 is a graph showing the transmittance-wavelength characteristics of a dichroic mirror 611 used in the combining optical system 60 shown in figures such as FIG. 2.

As shown in FIGS. 2, 3, and 4, the optical device 150 includes two display panels 20 (first display panel 21 and second display panel 22). The first display panel 21 has a plurality of first pixels 26, each including a first light-emitting element 260 shown in FIG. 5A. The first display panel 21 emits first color light L1 from each of the plurality of first pixels 26. The second display panel 22 has a plurality of second pixels 27, each including a second light-emitting element 270 shown in FIG. 5B, and a plurality of third pixels 28, each including a third light-emitting element 280 shown in FIG. 5B. The second display panel 22 emits second color light L2 having a different wavelength range from the first color light L1 from each of the plurality of second pixels 27 and emits third color light L3 having a different wavelength range from the first color light L1 and the second color light L2 from each of the plurality of third pixels 28.

The combining optical system 60 is composed of a dichroic prism 61 including a dichroic mirror 611 inclined with respect to the emitting surface of the first display panel 21 and the emitting surface of the second display panel 22. The dichroic prism 61 has an exit surface 616 opposite the projection lens system 70, a first entrance surface 614 parallel to and opposite the exit surface 616, a second entrance surface 615 formed between the exit surface 616 and the first entrance surface 614, and an end surface 613 parallel to and opposite the second entrance surface 615. As viewed in the third direction Y, the dichroic mirror 611 is formed on a diagonal line joining the corner between the exit surface 616 and the end surface 613 and the corner between the first entrance surface 614 and the second entrance surface 615.

The first display panel 21 is disposed parallel to the first entrance surface 614, whereas the second display panel 22 is disposed parallel to the second entrance surface 615. The dichroic mirror 611 transmits the first color light L1 emitted from the first display panel 21 to output the first color light from the exit surface 616 while reflecting the second color light L2 and the third color light L3 emitted from the second display panel 22 to output the second color light L2 and the third color light L3 from the exit surface 616. Thus, the color light (first color light L1) emitted from the first display panel 21 and the color light (second color light L2 and third color light L3) emitted from the second display panel 22 are combined into the combined light Lb, which is output from the exit surface 616 toward the projection lens system 70.

In the thus-configured optical device 150, each of the first color light L1, the second color light L2, and the third color light L3 corresponds to any of the three primary colors of light (red light (R), green light (G), and blue light (B)). In this embodiment, the first color light L1 emitted from the first display panel 21 has a shorter peak wavelength than the second color light L2 and the third color light L3 emitted from the second display panel 22. That is, the first color light L1 emitted from the first display panel 21 is blue light (B). The second color light L2 emitted from the second display panel 22 is green light (G), and the third color light L3 emitted from the second display panel 22 is red light (R).

In this embodiment, blue light (B) is light whose peak wavelength lies in the range from 400 to 500 nm, green light (G) is light whose peak wavelength lies in the range from 500 to 580 nm, and red light (R) is light whose peak wavelength lies in the range from 580 to 780 nm. Accordingly, for example, the dichroic mirror 611 has the reflectance-wavelength characteristics shown in FIG. 6, with the boundary between the transmission and reflection regions lying in the wavelength range from 500 to 520 nm.

Configuration of Light-Emitting Elements

Figure 7A:
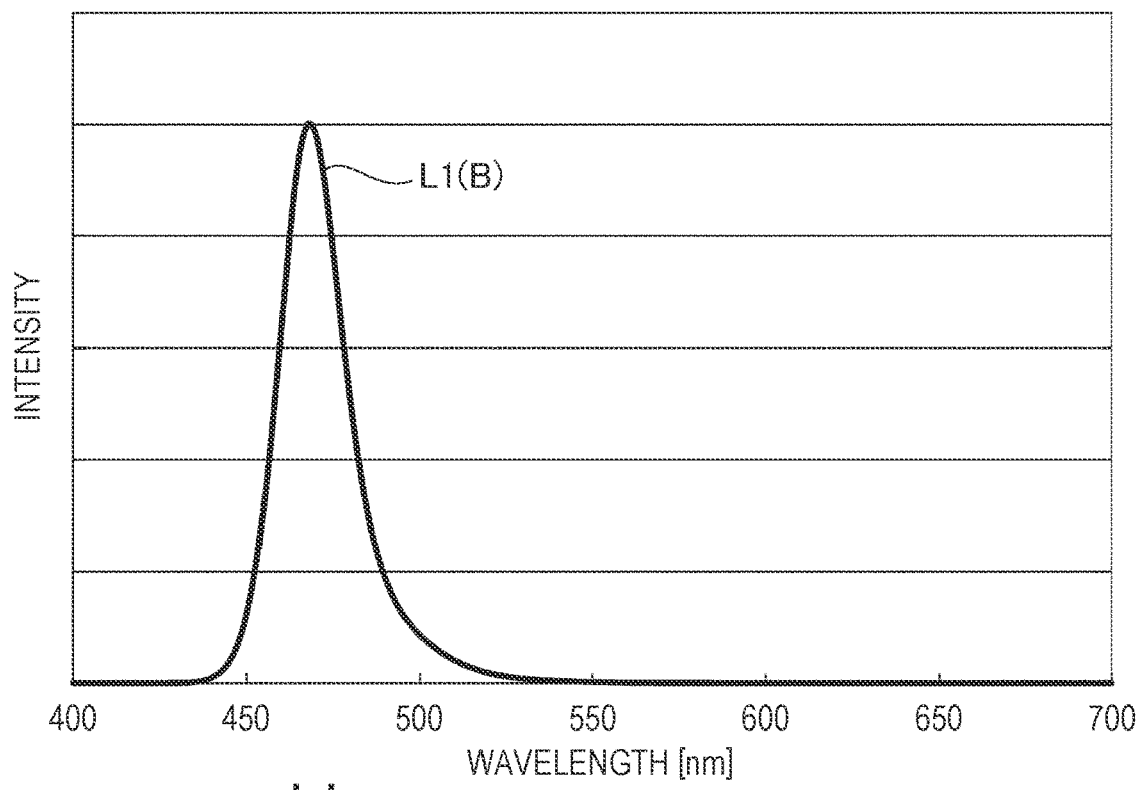
FIGS. 7A and 7B are graphs showing the spectrum of first color light emitted from a first display panel shown in figures such as FIG. 2.
Figure 7B:
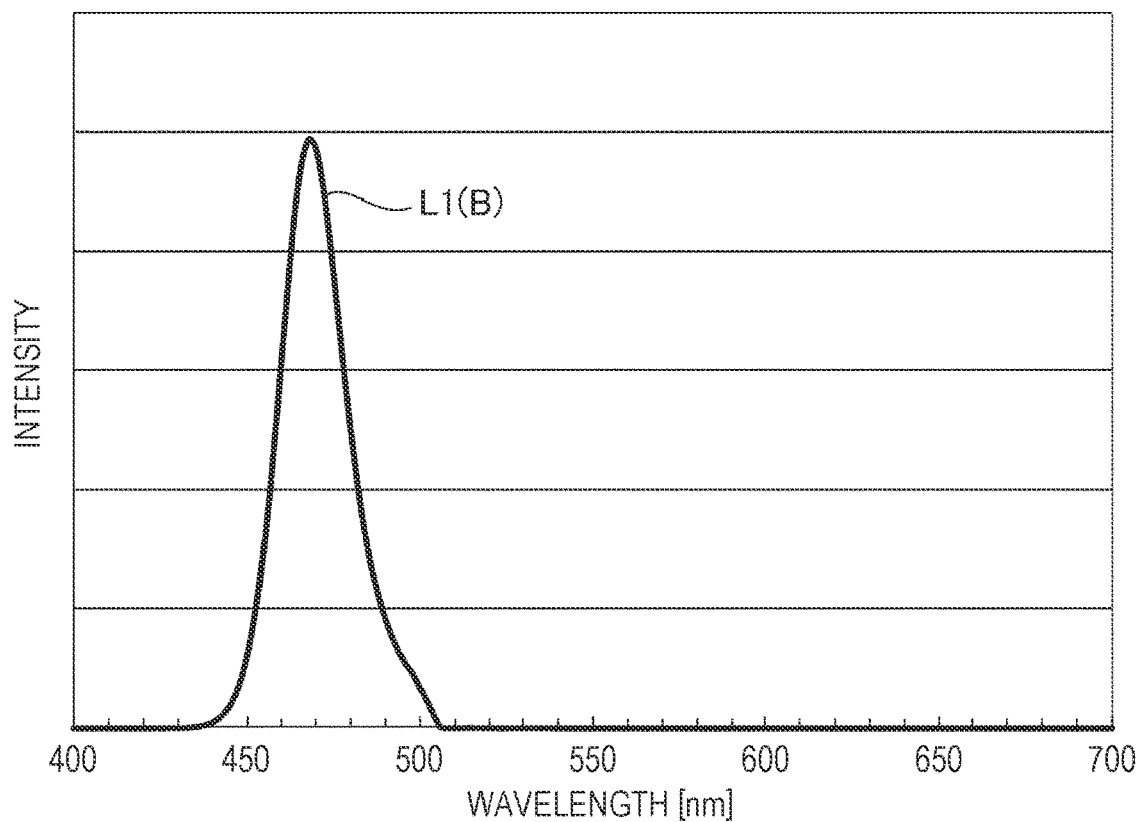
Figure 8A:
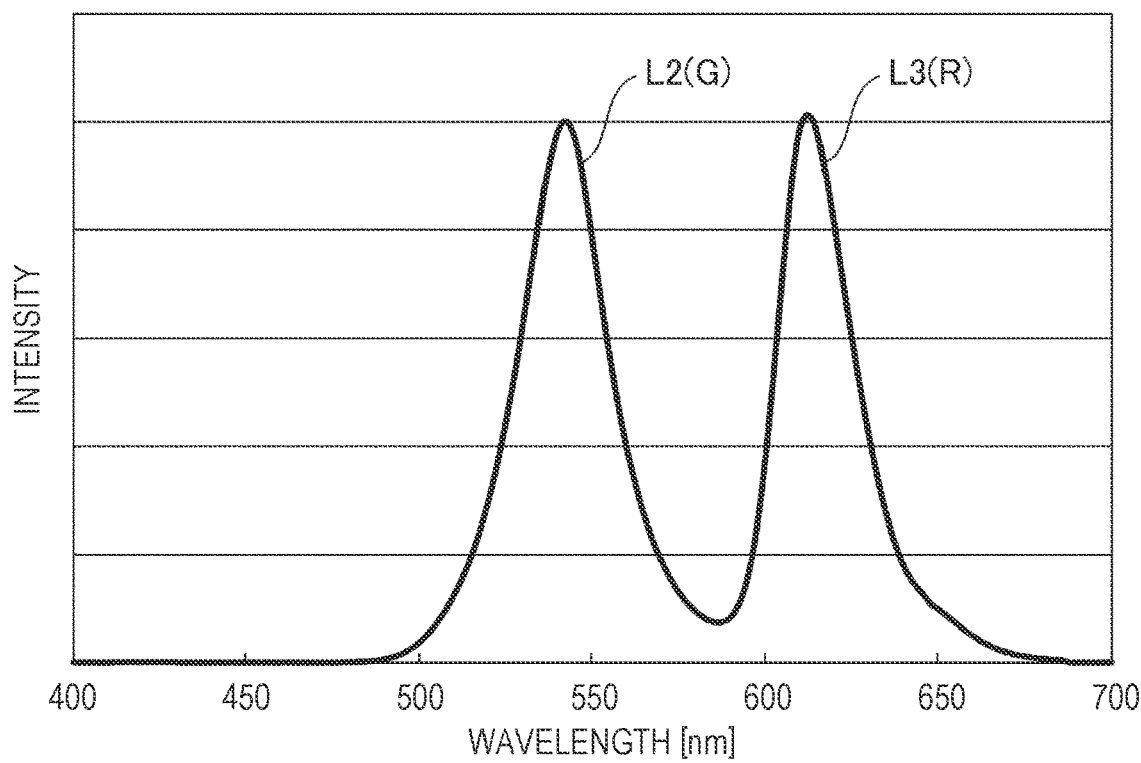
FIGS. 8A and 8B are graphs showing the spectra of second color light and third color light emitted from a second display panel shown in figures such as FIG. 2.
Figure 8B:
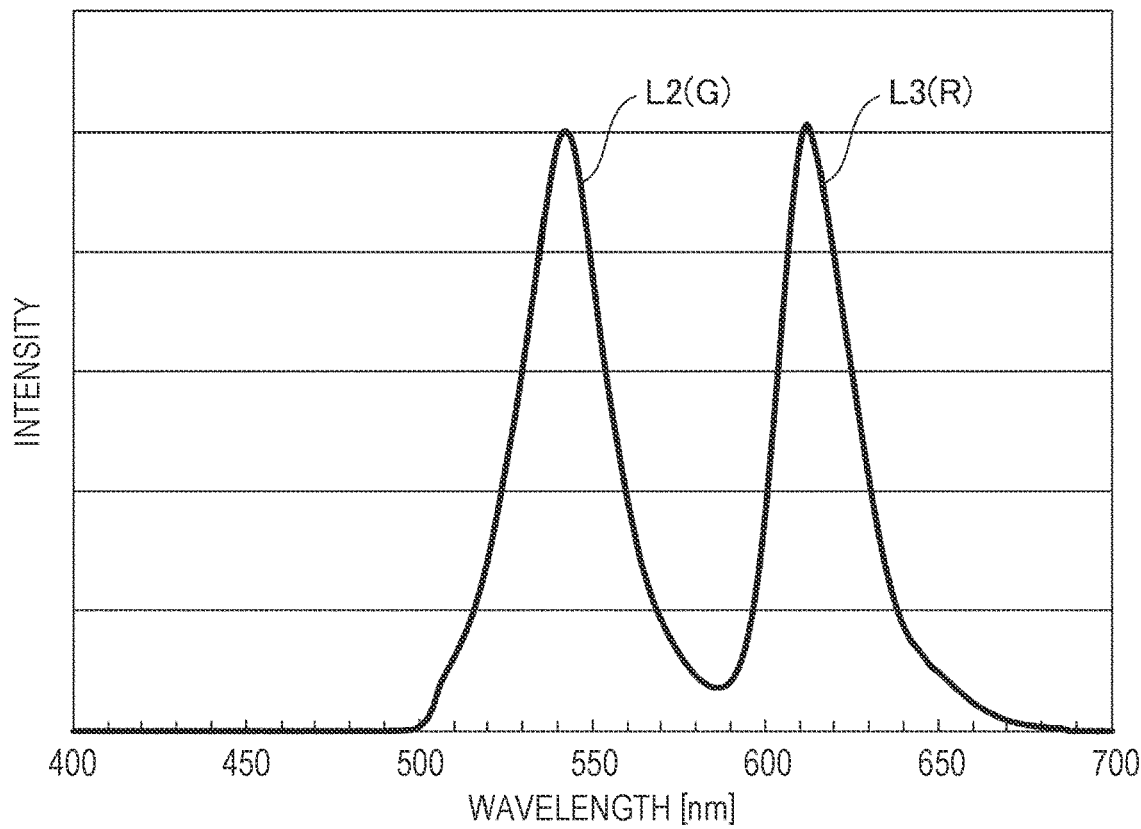

FIGS. 7A and 7B are graphs showing the spectrum of the first color light L1 emitted from the first display panel 21 shown in figures such as FIG. 4. FIG. 7A shows the spectrum before incidence on the dichroic mirror 611. FIG. 7B shows the spectrum after transmission through the dichroic mirror 611. FIGS. 8A and 8B are graphs showing the spectra of the second color light L2 and the third color light L3 emitted from the second display panel 22 shown in figures such as FIG. 2. FIG. 8A shows the spectra before incidence on the dichroic mirror 611. FIG. 8B shows the spectra after reflection from the dichroic mirror 611.

The first light-emitting elements 260, the second light-emitting elements 270, and the third light-emitting elements 280 shown in FIGS. 5A and 5B are organic electroluminescent elements. Thus, both the first display panel 21 and the second display panel 22 include a plurality of insulating films 251 formed on one surface of a substrate 250, with wiring lines and drive elements formed between the insulating films 251. The first light-emitting elements 260, the second light-emitting elements 270, and the third light-emitting elements 280 are formed on the side of the insulating films 251 facing away from the substrate 250. In this embodiment, the first light-emitting elements 260, the second light-emitting elements 270, and the third light-emitting elements 280 each have a multilayer structure including, for example, a first electrode 291 serving as a pixel electrode (anode), a hole transport layer 292, a light-emitting layer 293, an electron transport layer 294, and a second electrode 295 serving as a common electrode (cathode). A hole injection layer may be formed between the first electrode 291 and the hole transport layer 292.

In this embodiment, the first light-emitting elements 260 (first pixels 26), the second light-emitting elements 270 (second pixels 27), and the third light-emitting elements 280 (third pixels 28) each emit fluorescence or phosphorescence. Specifically, the first light-emitting elements 260, the second light-emitting elements 270, and the third light-emitting elements 280 emit fluorescence if the emission occurs via singlet excitons formed as electrons and holes are recombined to create an excited state. The first light-emitting elements 260, the second light-emitting elements 270, and the third light-emitting elements 280 emit phosphorescence if the emission occurs via triplet excitons formed as electrons and holes are recombined to create an excited state and via triplet excitons formed by intersystem crossing of singlet excitons.

As the material for the hole transport layer 292, various p-type polymeric materials and various p-type low-molecular-weight materials can be used alone or in combination. Examples of such materials include tetraarylbenzidine derivatives such as N,N'-di(1-naphthyl)-N,N'-diphenyl-1,1'-diphenyl-4,4'-diamine (NPD) and N,N'-diphenyl-N,N'-bis(3-methylphenyl)-1,1'-diphenyl-4,4'-diamine (TPD) and tetraaryldiaminofluorene compounds and derivatives thereof (amine compounds).

Examples of materials that may be used for the electron transport layer 294 include phenanthroline derivatives such as 2,9-dimethyl-4,7-diphenyl-1,10-phenanthroline (BCP); quinoline derivatives such as organic metal complexes having 8-quinolinol or derivatives thereof as ligands, including tris(8-quinolinolato)aluminum ($Alq_3$); azaindolizine derivatives, oxadiazole derivatives, perylene derivatives, pyridine derivatives, pyrimidine derivatives, quinoxaline derivatives, diphenylquinone derivatives, and nitro-substituted fluorene derivatives.

Examples of materials that may be used for the hole injection layer include copper phthalocyanine, 4,4',4"-tris(N,N-phenyl-3-methylphenylamino)triphenylamine (m-MTDATA), and N,N'-bis-(4-diphenylamino-phenyl)-N,N'-diphenyl-biphenyl-4-4'-diamine.

Examples of materials that may be used as hosts in the light-emitting layer 293 include anthracene derivatives, naphthacene derivatives, perylene derivatives, distyrylbenzene derivatives, distyrylamine derivatives, quinolinolato metal complexes such as tris(8-quinolinolato) aluminum complex ($Alq_3$), triarylamine derivatives, oxadiazole derivatives, silole derivatives, dicarbazole derivatives, oligothiophene derivatives, benzopyran derivatives, triazole derivatives, benzoxazole derivatives, and benzothiazole derivatives.

Examples of materials that may be used as red dopants in the light-emitting layer 293 include perylene derivatives such as tetraaryldiindenoperylene derivatives, europium complexes, benzopyran derivatives, rhodamine derivatives, benzothioxanthene derivatives, porphyrin derivatives, Nile Red, 2-(1,1-dimethylethyl)-6-(2-(2,3,6,7-tetrahydro-1,1,7,7-tetramethyl-1H,5H-benzo(ij)quinolizin-9-yl)ethenyl)-4H-pyran-4H-ylidene)propanedinitrile (DCJTB), and 4-(dicyanomethylene)-2-methyl-6-(p-dimethylaminostyryl)-4H-pyran (DCM). In addition, any red phosphorescent material that emits red phosphorescence may be used. Examples of such materials include metal complexes, such as iridium, ruthenium, platinum, osmium, rhenium, and palladium complexes, in which at least one of the ligands has a backbone such as a phenylpyridine backbone, a bipyridyl backbone, or a porphyrin backbone.

Examples of materials that may be used as blue dopants include distyrylamine derivatives such as distyryldiamine compounds, fluoranthene derivatives, pyrene derivatives, perylene and perylene derivatives, anthracene derivatives, benzoxazole derivatives, benzothiazole derivatives, benzimidazole derivatives, chrysene derivatives, phenanthrene derivatives, distyrylbenzene derivatives, tetraphenylbutadiene, 4,4'-bis(9-ethyl-3-carbazovinylene)-1,1'-biphenyl (BCzVBi), poly[(9,9-dioctylfluorene-2,7-diyl)-co-(2,5-dimethoxybenzene-1,4-diyl)], poly[(9,9-dihexyloxyfluorene-2,7-diyl)-alt-co-(2-methoxy-5-{2-ethoxyhexyloxy}phenylene-1,4-diyl)], and poly[(9,9-dioctylfluorene-2,7-diyl)-co-(ethynylbenzene)]. In addition, any blue phosphorescent material that emits blue phosphorescence may be used. Examples of such materials include metal complexes such as iridium, ruthenium, platinum, osmium, rhenium, and palladium complexes.

Examples of materials that may be used as green dopants include quinacridone and derivatives thereof, 9,10-bis[(9-ethyl-3-carbazole)-vinylenyl]-anthracene, poly(9,9-dihexyl-2,7-vinylenefluorenylene), poly[(9,9-dioctylfluorene-2,7-diyl)-co-(1,4-diphenylene-vinylene-2-methoxy-5-{2-ethylhexyloxy}benzene)], and poly[(9,9-dioctyl-2,7-divinylenefluorenylene)-alt-co-(2-methoxy-5-(2-ethoxyhexyloxy)-1,4-phenylene)]. In addition, any green phosphorescent material that emits blue phosphorescence may be used. Examples of such materials include metal complexes such as iridium, ruthenium, platinum, osmium, rhenium, and palladium complexes. Preferred among these metal complexes are those in which at least one of the ligands has a backbone such as a phenylpyridine backbone, a bipyridyl backbone, or a porphyrin backbone.

In this embodiment, the first light-emitting elements 260, the second light-emitting elements 270, and the third light-emitting elements 280 have, for example, the following structures:

First Light-Emitting Elements 260
Hole transport layer 292: 40 nm
Light-emitting layer 293: host material containing 8% by mass of blue dopant (15 nm)
Electron transport layer 294: 25 nm
Second Light-Emitting Elements 270
Hole transport layer 292: 40 nm
Light-emitting layer 293: host material containing 10% by mass of green dopant (15 nm)
Electron transport layer 294: 25 nm
Third Light-Emitting Elements 280
Hole transport layer 292: 40 nm
Light-emitting layer 293: host material containing 1.5% by mass of red dopant (15 nm)
Electron transport layer 294: 25 nm If the organic electroluminescent elements in this embodiment are configured as top-emitting elements having optical resonators, a reflective layer 296 such as an aluminum layer is formed on the side of the first electrode 291 facing the substrate 250, and the second electrode 295 is composed of a half-mirror layer formed of a magnesium-silver alloy and having a thickness of 10 nm. Although the layers that form the first light-emitting elements 260, the second light-emitting elements 270, and the third light-emitting elements 280 are shown as having the same thickness in FIGS. 5A and 5B, the thicknesses of the layers such as the first electrode 291 and the light-emitting layer 293 are adjusted to adjust the optical length such as between the second electrode 295 and the reflective layer 296. In this embodiment, the wavelength range has the following relationship:

$$\text{First color light } L1(B) < \text{second color light } L2(G) < \text{third color light } L3(R)$$

Accordingly, the thicknesses of the layers such as the first electrode 291 and the light-emitting layer 293 have the following relationship:

$$\text{First light-emitting elements } 260 < \text{second light-emitting elements } 270 < \text{third light-emitting elements } 280$$

The spectrum of the first color light L1 (B) emitted from the thus-configured first display panel 21 is as shown in FIG. 7A, with the peak wavelength being 470 nm. The spectrum of the second color light L2 (G) emitted from the second display panel 22 is as shown in FIG. 8A, with the peak wavelength being 540 nm. The spectrum of the third color light L3 (R) emitted from the second display panel 22 is as shown in FIG. 8A, with the peak wavelength being 612 nm.

Basic Operation

Figure 9:
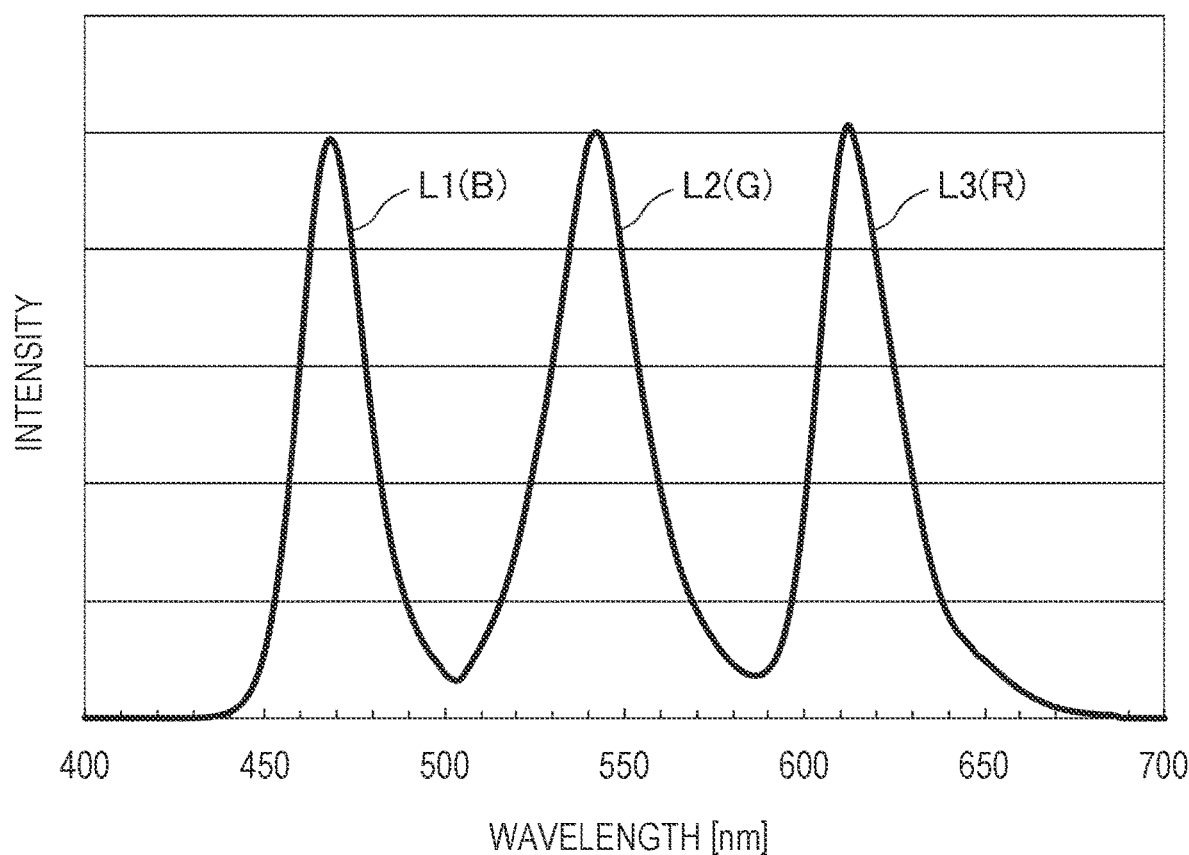
FIG. 9 is a graph showing the spectrum of combined light shown in figures such as FIG. 4.

FIG. 9 is a graph showing the spectrum of the combined light Lb shown in figures such as FIG. 4. When the first display panel 21 and the second display panel 22 of the display apparatus 100 are driven, the first display panel 21 emits the first color light L1 (B) toward the combining optical system 60. The spectrum of the first color light L1 (B) after transmission through the dichroic mirror 611 is as shown in FIG. 7B. The second display panel 22 emits the second color light L2 (G) and the third color light L3 (R) toward the combining optical system 60. The spectra of the second color light L2 (G) and the third color light L3 (R) after reflection from the dichroic mirror 611 are as shown in FIG. 8B.

The first color light L1 (B), the second color light L2 (G), and the third color light L3 (R) are combined by the combining optical system 60. The combined light Lb output from the combining optical system 60 passes through the projection lens system 70 and enters the entrance section 40 of the light guide system 30. The spectrum of the combined light Lb is, for example, as shown in FIG. 9.

The combined light Lb entering the entrance section 40 in the form of collimated light is refracted by the entrance surface 41 and travels toward the reflective surface 42. The combined light Lb is then reflected by the reflective surface 42 and travels again toward the entrance surface 41. Since the combined light Lb is incident on the entrance surface 41 at an incident angle greater than the critical angle, the combined light Lb is reflected toward the light guide section 50 by the entrance surface 41 and travels toward the light guide section 50. Although the combined light Lb is incident on the entrance surface 41 of the entrance section 40 in the form of collimated light, the entrance surface 41 and the reflective surface 42 may be composed of a surface such as a free-form surface so that combined light Lb incident on the entrance surface 41 in the form of uncollimated light is converted into collimated light while being reflected between the reflective surface 42 and the entrance surface 41. In this case, the projection lens system 70 can be omitted.

The combined light Lb travels through the light guide section 50 from the one side X1 toward the other side X2 in the first direction X while being reflected between the first surface 56 and the second surface 57. A portion of the combined light Lb incident on the partially reflective surfaces 55 is reflected by the partially reflective surfaces 55 and is output from the exit section 58 toward the viewer's eye E. The remainder of the combined light Lb incident on the partially reflective surfaces 55 is transmitted through the partially reflective surfaces 55 and is incident on the next adjacent partially reflective surfaces 55 on the other side X2 in the first direction X. Thus, the combined light Lb reflected by each of the plurality of partially reflective surfaces 55 toward the one side Z1 in the second direction Z is output from the exit section 58 toward the viewer's eye E.

Thus, the viewer can perceive a color image produced by the combination of the first color light L1 (B) emitted from the first display panel 21 and the second color light L2 (G) and the third color light L3 (R) emitted from the second display panel 22. In the thus-configured display apparatus 100, the direction of the image perceived by the viewer parallel to the first direction X is the horizontal direction H, whereas the direction of the image perceived by the viewer parallel to the third direction Y is the vertical direction V. Light coming from the outside enters the light guide section 50 and is then transmitted through the partially reflective surfaces 55 to reach the viewer's eye E. Thus, the viewer can see the outside, such as the scenery, through the display apparatus 100.

Main Advantages of this Embodiment

As described above, according to this embodiment, the combining optical system 60 combines the first color light L1 emitted from the first display panel 21 and the second color light L2 and the third color light L3 emitted from the second display panel 22. Thus, the two display panels 20 (first display panel 21 and second display panel 22) can provide a bright color display. In addition, since only two display panels 20 are required, assembly can be efficiently performed. In addition, since only two display panels 20 are required, the combining optical system 60 requires only one dichroic mirror 611. In addition, since both the first display panel 21 and the second display panel 22 are display panels including light-emitting elements, these display panels, unlike liquid crystal panels, do not require a component such as a light source. This contributes to a reduction in the size, weight, and cost of the display apparatus 100.

The first color light L1 has a shorter wavelength than the second color light L2 and the third color light L3. That is, the first color light L1 is blue light (B), and the second color light L2 and the third color light L3 are green light (G) and red light (R), respectively. In general, light-emitting elements that emit a shorter wavelength tend to have a shorter life than light-emitting elements that emit a longer wavelength when driven under the same conditions. Accordingly, if the first display panel 21, which emits one color of light, emits light with a shorter wavelength, the load on the first display panel 21 can be reduced even if the first color light L1, the second color light L2, and the third color light L3 have the same luminance. This extends the life of the first display panel 21.

In this embodiment, the first display panel 21, which emits one color of light, is configured to emit light with a shorter wavelength, i.e., blue light (B), since light-emitting elements that emit a shorter wavelength tend to have a shorter life than light-emitting elements that emit a longer wavelength when driven under the same conditions; however, if light-emitting elements that emit color light other than blue light (B) have a shorter life, depending on factors such as the material used, the display panel including the light-emitting elements having a shorter life may be configured to emit one color of light. In situations such as where the light-emitting elements that emit green light (G) have a shorter life, the correspondences between the first color light L1, the second color light L2, and the third color light L3 and blue light (B), green light (G), and red light (R) may be set as follows:

First color light L1: green light (G)
Second color light L2: blue light (B)
Third color light L3: red light (R)

In situations such as where the light-emitting elements that emit red light (R) have a shorter life, the correspondences between the first color light L1, the second color light L2, and the third color light L3 and blue light (B), green light (G), and red light (R) may be set as follows:

First color light L1: red light (R)
Second color light L2: blue light (B)
Third color light L3: green light (G)

Second Embodiment

Although the correspondences between the first color light L1, the second color light L2, and the third color light L3 and blue light (B), green light (G), and red light (R) are set based on the wavelength of each color of light (life) in the first embodiment described above, the correspondences between the first color light L1, the second color light L2, and the third color light L3 and blue light (B), green light (G), and red light (R) may be set based on the difference in emission mechanism. For example, the first light-emitting elements 260 may be configured to emit light via one of a singlet exciton and a triplet exciton, and the second light-emitting elements 270 and the third light-emitting elements 280 may be configured to emit light via the other exciton. More specifically, the first light-emitting elements 260 may be configured to emit blue fluorescence (B) (first color light L1 (B)) via singlet excitons, and the second light-emitting elements 270 and the third light-emitting elements 280 may be configured to emit green phosphorescence (G) (second color light L2 (G)) and red phosphorescence (R) (third color light L3 (R)), respectively, via triplet excitons.

In this case, the first light-emitting elements 260, the second light-emitting elements 270, and the third light-emitting elements 280 have, for example, the following structures:

First Light-Emitting Elements 260
Hole transport layer 292: 40 nm
Light-emitting layer 293 (fluorescent material): host material containing 8% by mass of blue dopant (15 nm)
Electron transport layer 294: 25 nm
Second Light-Emitting Elements 270
Hole transport layer 292: 40 nm
Light-emitting layer 293 (phosphorescent material): host material containing 10% by mass of green dopant (15 nm)
Electron transport layer 294: 25 nm
Third Light-Emitting Elements 280
Hole transport layer 292: 40 nm
Light-emitting layer 293 (phosphorescent material): host material containing 1.5% by mass of red dopant (15 nm)
Electron transport layer 294: 25 nm This configuration provides the advantage of facilitating the use of a common material in the steps of forming the second light-emitting elements 270 and the third light-emitting elements 280.

Third Embodiment

Although the correspondences between the first color light L1, the second color light L2, and the third color light L3 and blue light (B), green light (G), and red light (R) are set based on the emission mechanism in the second embodiment, the correspondences between the first color light L1, the second color light L2, and the third color light L3 and blue light (B), green light (G), and red light (R) may be set based on whether the emission mechanism is simple fluorescence or thermally activated delayed fluorescence.

For example, the first light-emitting elements 260 may be configured to emit simple blue fluorescence (B) as the first color light L1, and the second light-emitting elements 270 and the third light-emitting elements 280 may be configured to emit green thermally activated delayed fluorescence (G) as the second color light L2 and red thermally activated delayed fluorescence (R) as the third color light L3, respectively. With this configuration, the load on the second light-emitting elements 270 and the third light-emitting elements 280 formed on the second display panel 22 can be reduced since thermally activated delayed fluorescence has significantly high emission efficiency. This provides the advantage of extending the life of the second display panel 22 even if color light with high luminance is emitted from the second light-emitting elements 270 and the third light-emitting elements 280 formed on the second display panel 22.

Fourth Embodiment

Figure 10:
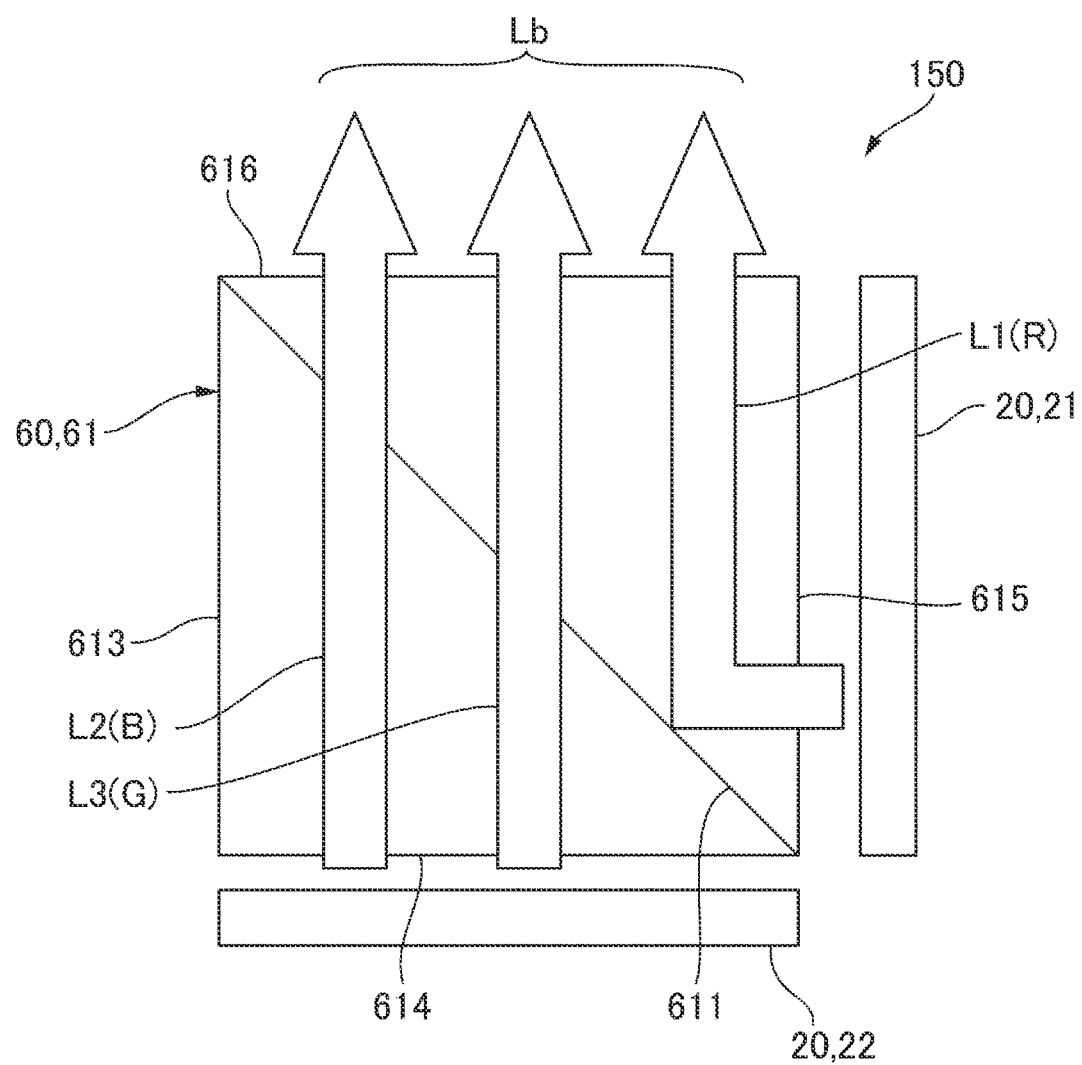
FIG. 10 is an illustration of an optical device according to a fourth embodiment of the invention as viewed in the third direction.
Figure 11:
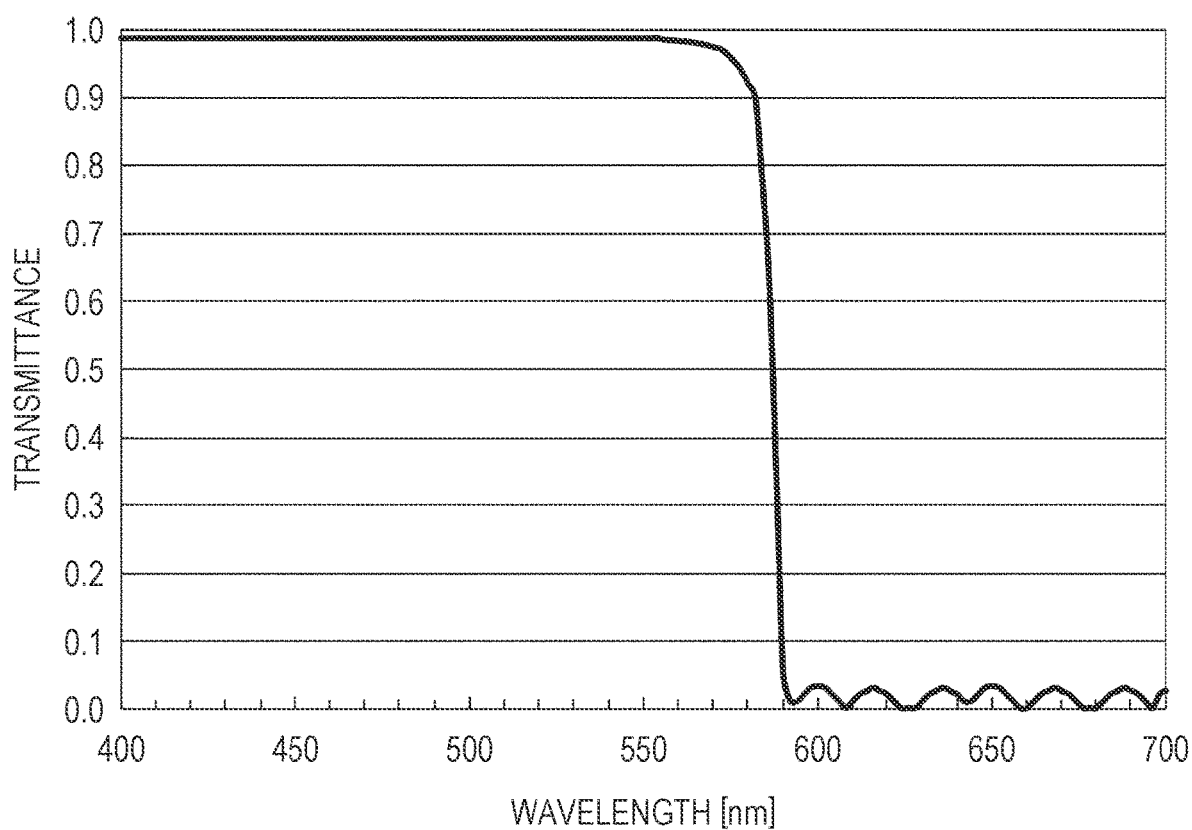
FIG. 11 is a graph showing the transmittance-wavelength characteristics of a dichroic mirror used in a combining optical system shown in FIG. 10.
Figure 12A:
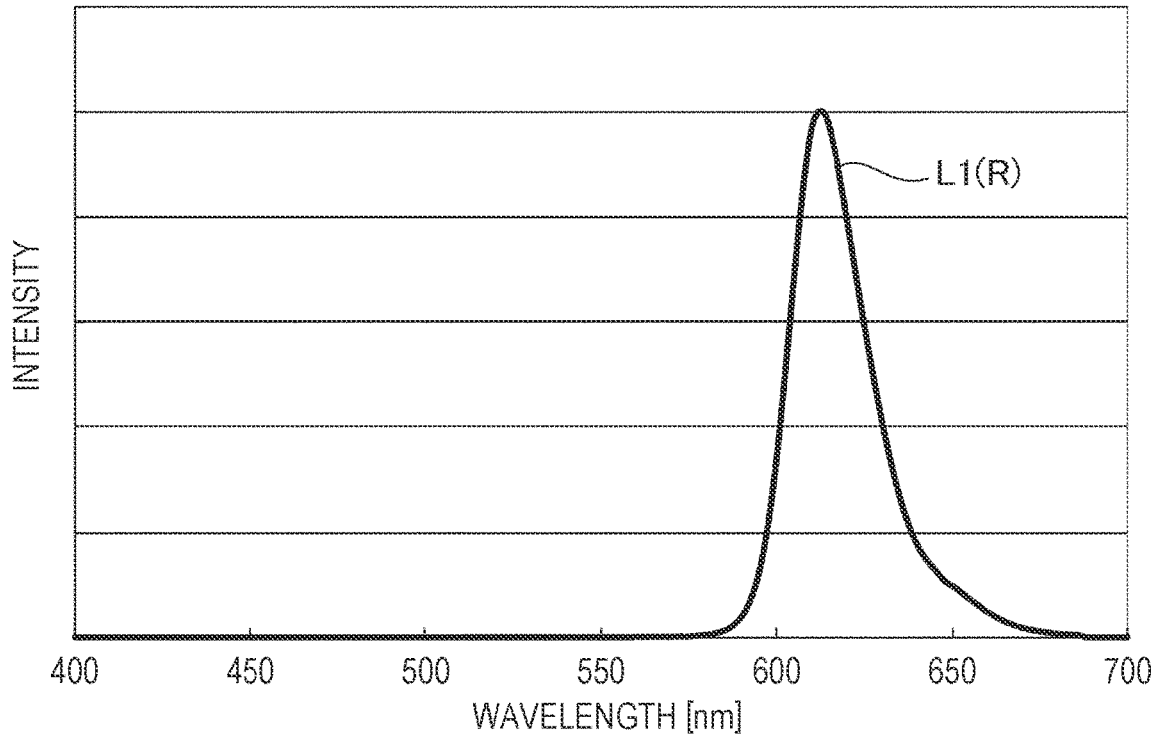
FIGS. 12A and 12B are graphs showing the spectrum of first color light emitted from a first display panel shown in FIG. 10.
Figure 12B:
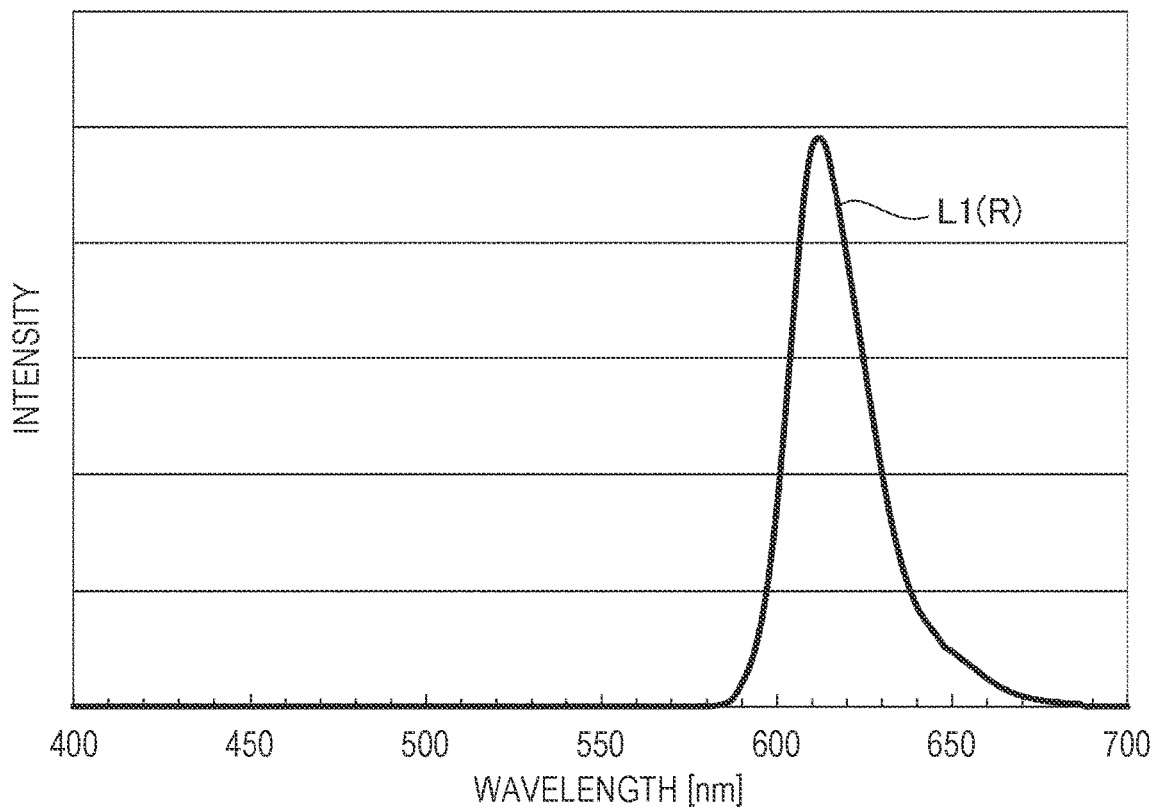
Figure 13A:
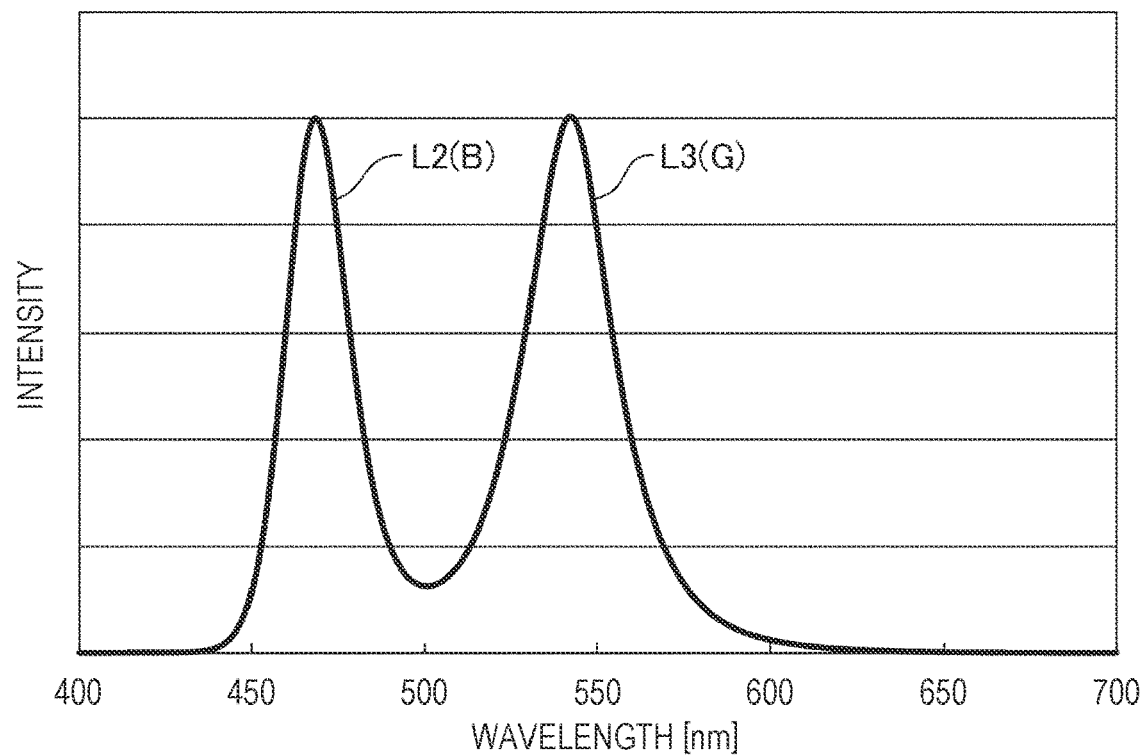
FIGS. 13A and 13B are graphs showing the spectra of second color light and third color light emitted from a second display panel shown in FIG. 10.
Figure 13A:
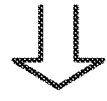
Figure 13B:
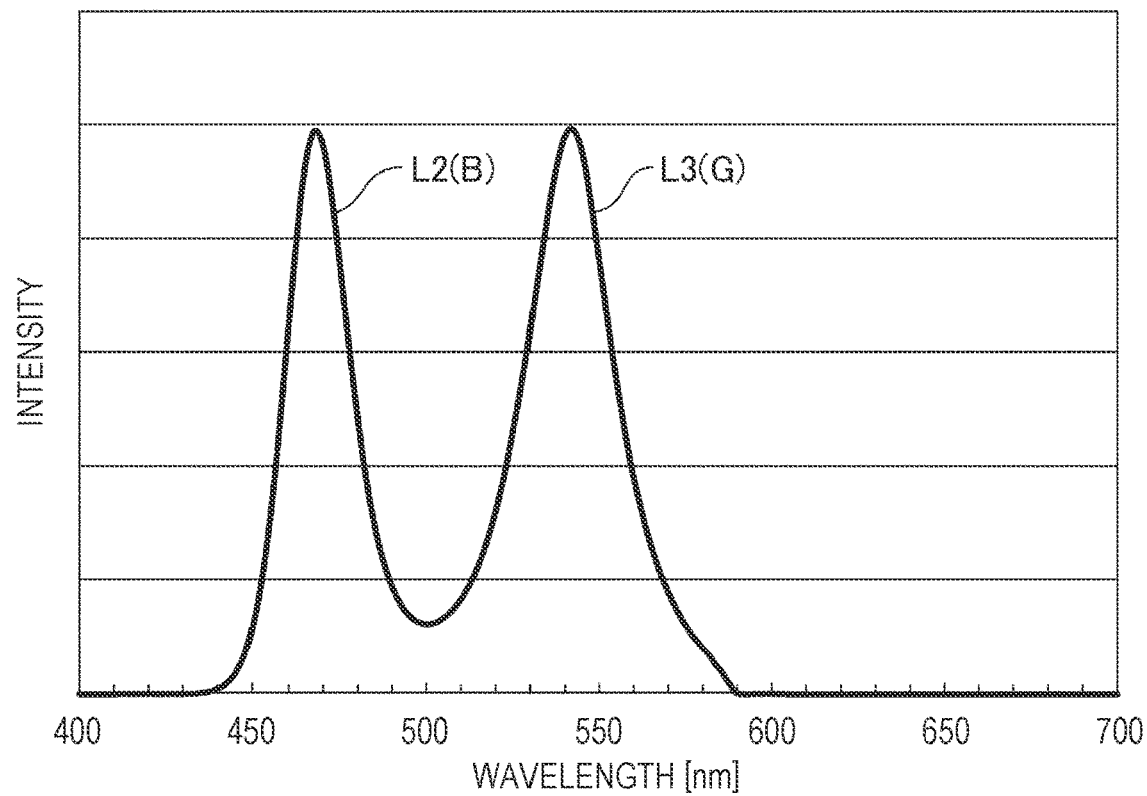
Figure 14:
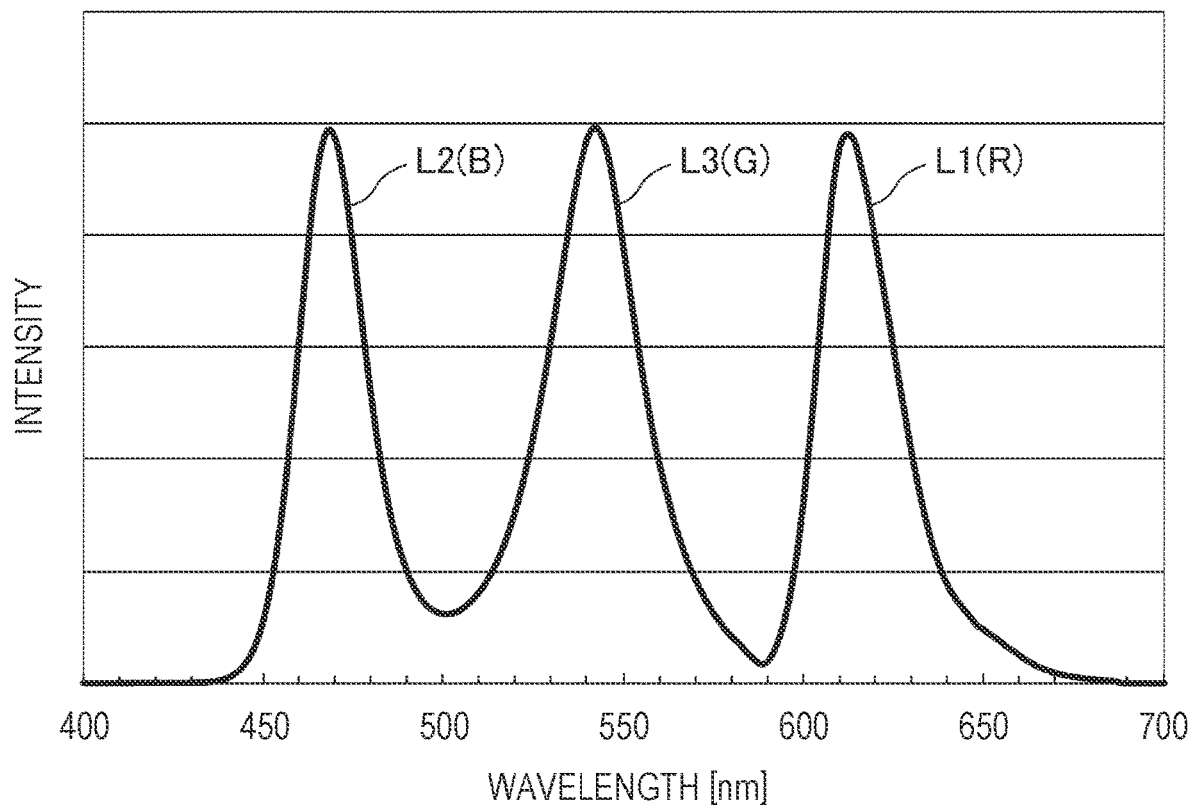
FIG. 14 is a graph showing the spectrum of combined light shown in FIG. 10.

FIG. 10 is an illustration of an optical device 150 according to a fourth embodiment of the invention as viewed in the third direction Y. FIG. 11 is a graph showing the transmittance-wavelength characteristics of a dichroic mirror 611 used in the combining optical system 60 shown in FIG. 10. FIGS. 12A and 12B are graphs showing the spectrum of the first color light L1 emitted from the first display panel 21 shown in FIG. 10. FIG. 12A shows the spectrum before incidence on the dichroic mirror 611. FIG. 12B shows the spectrum after reflection from the dichroic mirror 611. FIGS. 13A and 13B are graphs showing the spectra of the second color light L2 and the third color light L3 emitted from the second display panel 22 shown in FIG. 10. FIG. 13A shows the spectra before incidence on the dichroic mirror 611. FIG. 13B shows the spectra after transmission through the dichroic mirror 611. FIG. 14 is a graph showing the spectrum of the combined light Lb shown in FIG. 10. The basic configuration of this embodiment is similar to that of the first embodiment; therefore, common portions are indicated by the same reference numerals, and a description thereof is omitted herein.

In the first embodiment described above, the dichroic mirror 611 used in the combining optical system 60 (dichroic prism 61) has the property of transmitting the first color light L1 and reflecting the second color light L2 and the third color light L3. In contrast, in this embodiment, as shown in FIG. 10, the dichroic mirror 611 used in the combining optical system 60 (dichroic prism 61) reflects the first color light L1 and transmits the second color light L2 and the third color light L3. Accordingly, the first display panel 21 is disposed parallel to and opposite the second entrance surface 615, whereas the second display panel 22 is disposed parallel to and opposite the first entrance surface 614. In this embodiment, the first color light L1 is red light (R), the second color light L2 is blue light (B), and the third color light L3 is green light (G). Thus, the transmittance-wavelength characteristics of the dichroic mirror 611 used in the combining optical system 60 shown in FIG. 10 are as shown in FIG. 11, with the boundary between the transmission and reflection regions lying in the wavelength range from 590 to 600 nm. Thus, the dichroic mirror 611 reflects the first color light L1 (R) and transmits the second color light L2 (B) and the third color light L3 (G).

In this embodiment, the first light-emitting elements 260, the second light-emitting elements 270, and the third light-emitting elements 280 have, for example, the following structures:

First Light-Emitting Elements 260
Hole transport layer 292: 40 nm
Light-emitting layer 293: host material containing 1.5% by mass of red dopant (15 nm)
Electron transport layer 294: 25 nm
Second Light-Emitting Elements 270
Hole transport layer 292: 40 nm
Light-emitting layer 293: host material containing 8% by mass of blue dopant (15 nm)
Electron transport layer 294: 25 nm
Third Light-Emitting Elements 280
Hole transport layer 292: 40 nm
Light-emitting layer 293: host material containing 10% by mass of green dopant (15 nm)
Electron transport layer 294: 25 nm The spectrum of the first color light L1 (R) emitted from the thus-configured first display panel 21 is as shown in FIG. 12A, with the peak wavelength being 612 nm. The spectrum of the first color light L1 (R) emitted from the first display panel 21 after reflection from the dichroic mirror 611 is as shown in FIG. 12B. The spectrum of the second color light L2 (B) emitted from the second display panel 22 is as shown in FIG. 13A, with the peak wavelength being 469 nm. The spectrum of the third color light L3 (G) emitted from the second display panel 22 is as shown in FIG. 13A, with the peak wavelength being 542 nm. The spectra of the second color light L2 (B) emitted from the second display panel 22 and the third color light L3 (G) emitted from the second display panel 22 after transmission through the dichroic mirror 611 are as shown in FIG. 13B. The first color light L1 (R), the second color light L2 (G), and the third color light L3 (B) are combined by the combining optical system 60. The spectrum of the combined light Lb output from the combining optical system 60 is as shown in, for example, FIG. 14.

Fifth Embodiment

The correspondences between the first color light L1 emitted from the first display panel 21, the second color light L2 emitted from the second display panel 22, and the third color light L3 emitted from the second display panel 22 and blue light (B), green light (G), and red light (R) may be set such that two colors of light with closer peak wavelengths are emitted from the second display panel 22 and one color of light with a peak wavelength farther away from those of the two colors of light are emitted from the first display panel 21. Specifically, the difference in peak wavelength between the second color light L2 and the third color light L3 is smaller than the difference in peak wavelength between the first color light L1 and the second color light L2 and the difference in peak wavelength between the first color light L1 and the third color light L3. This configuration facilitates proper design of a component such as the dichroic mirror 611 used in the combining optical system 60 and also facilitates optimization of the optical characteristics of a component such as the dichroic mirror 611, thus reducing light intensity loss.

For example, if a comparison between the difference in peak wavelength between blue light (B) and green light (G) and the difference in peak wavelength between green light (G) and red light (R) shows that the difference in peak wavelength between blue light (B) and green light (G) is larger than the difference in peak wavelength between green light (G) and red light (R), the correspondences are set as follows:

First color light L1: blue light (B)
Second color light L2: green light (G)
Third color light L3: red light (R)

In contrast, if a comparison between the difference in peak wavelength between blue light (B) and green light (G) and the difference in peak wavelength between green light (G) and red light (R) shows that the difference in peak wavelength between blue light (B) and green light (G) is smaller than the difference in peak wavelength between green light (G) and red light (R), the correspondences are set as follows:

First color light L1: red light (R)
Second color light L2: blue light (B)
Third color light L3: green light (G)

Sixth Embodiment

Figure 15:
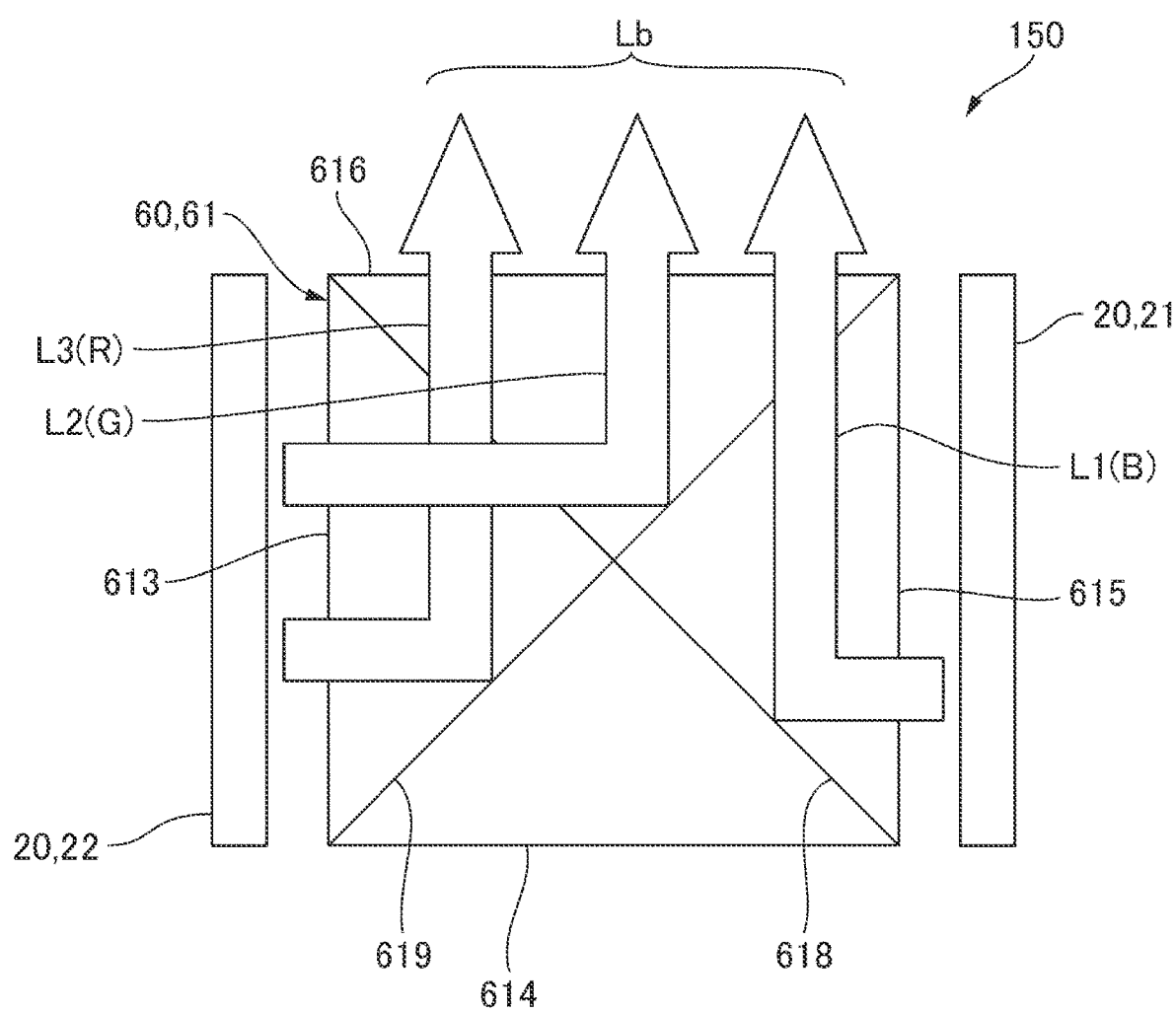
FIG. 15 is an illustration of an optical device according to a sixth embodiment of the invention as viewed in the third direction.

FIG. 15 is an illustration of an optical device 150 according to a sixth embodiment of the invention as viewed in the third direction Y. The basic configuration of this embodiment is similar to that of the first embodiment; therefore, common portions are indicated by the same reference numerals, and a description thereof is omitted herein.

In the first to fourth embodiments described above, the combining optical system 60 includes the dichroic mirror 611 that transmits the color light emitted from one of the first display panel 21 and the second display panel 22 and that reflects the color light emitted from the other display panel. In contrast, in this embodiment, as shown in FIG. 15, the optical device 150 includes a first dichroic mirror 618 that reflects the color light (first color light L1) emitted from the first display panel 21 and that transmits the color light (second color light L2 and third color light L3) emitted from the second display panel 22 and a second dichroic mirror 619 that transmits the color light (first color light L1) emitted from the first display panel 21 and that reflects the color light (second color light L2 and third color light L3) emitted from the second display panel 22.

For example, the first dichroic mirror 618 reflects the first color light L1 (B), i.e., blue light (B), emitted from the first display panel 21 and transmits the second color light L2 (G), i.e., green light (G), and the third color light L3 (R), i.e., red light (R), emitted from the second display panel 22. In contrast, the second dichroic mirror 619 transmits the first color light L1 (B), i.e., blue light (B), emitted from the first display panel 21 and reflects the second color light L2 (G), i.e., green light (G), and the third color light L3 (R), i.e., red light (R), emitted from the second display panel 22.

With this configuration, the two display panels (first display panel 21 and second display panel 22) can provide a color image that can be perceived by the viewer.

Seventh Embodiment

Figure 16:
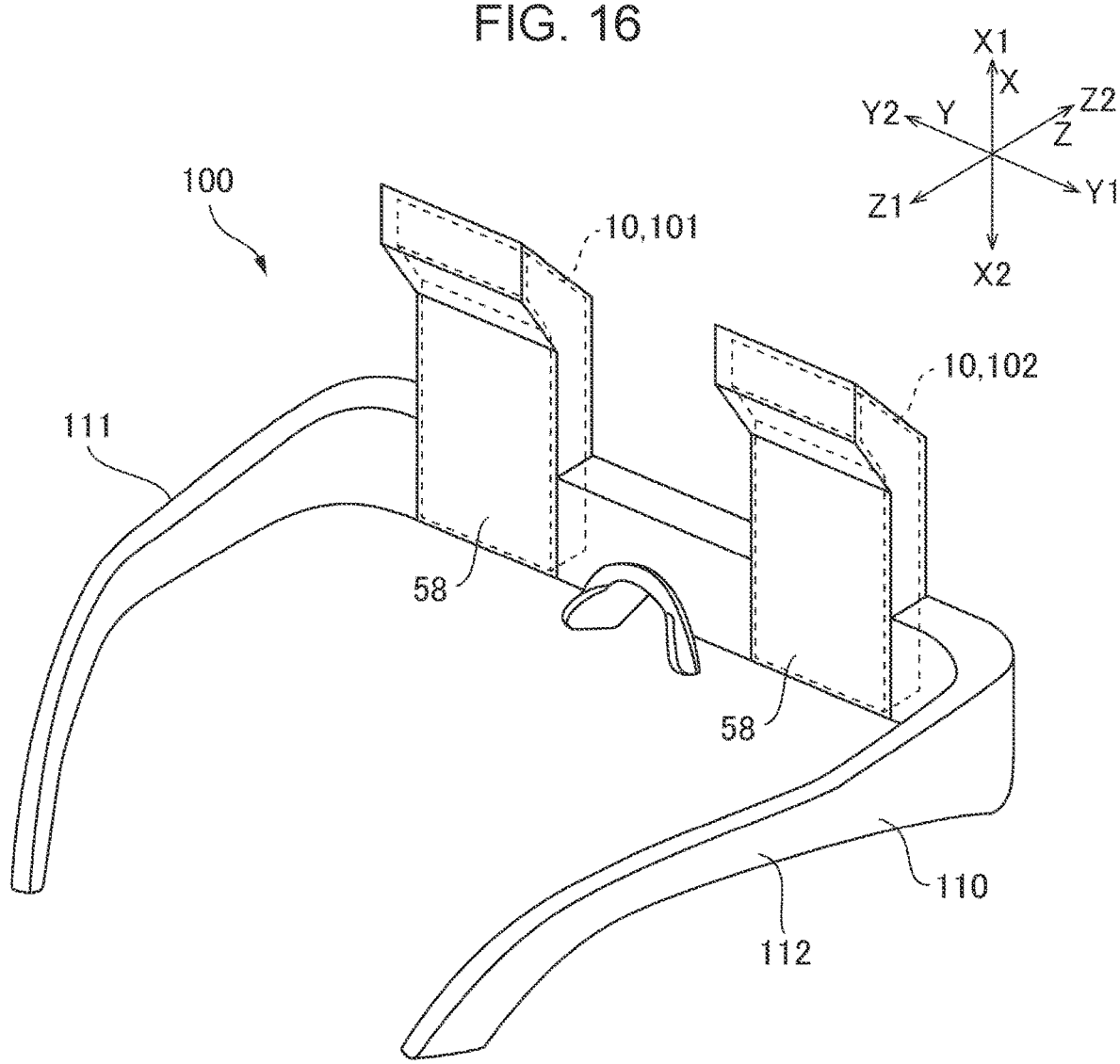
FIG. 16 is a schematic illustration of an example of the external appearance of a display apparatus according to a seventh embodiment of the invention.
Figure 17:
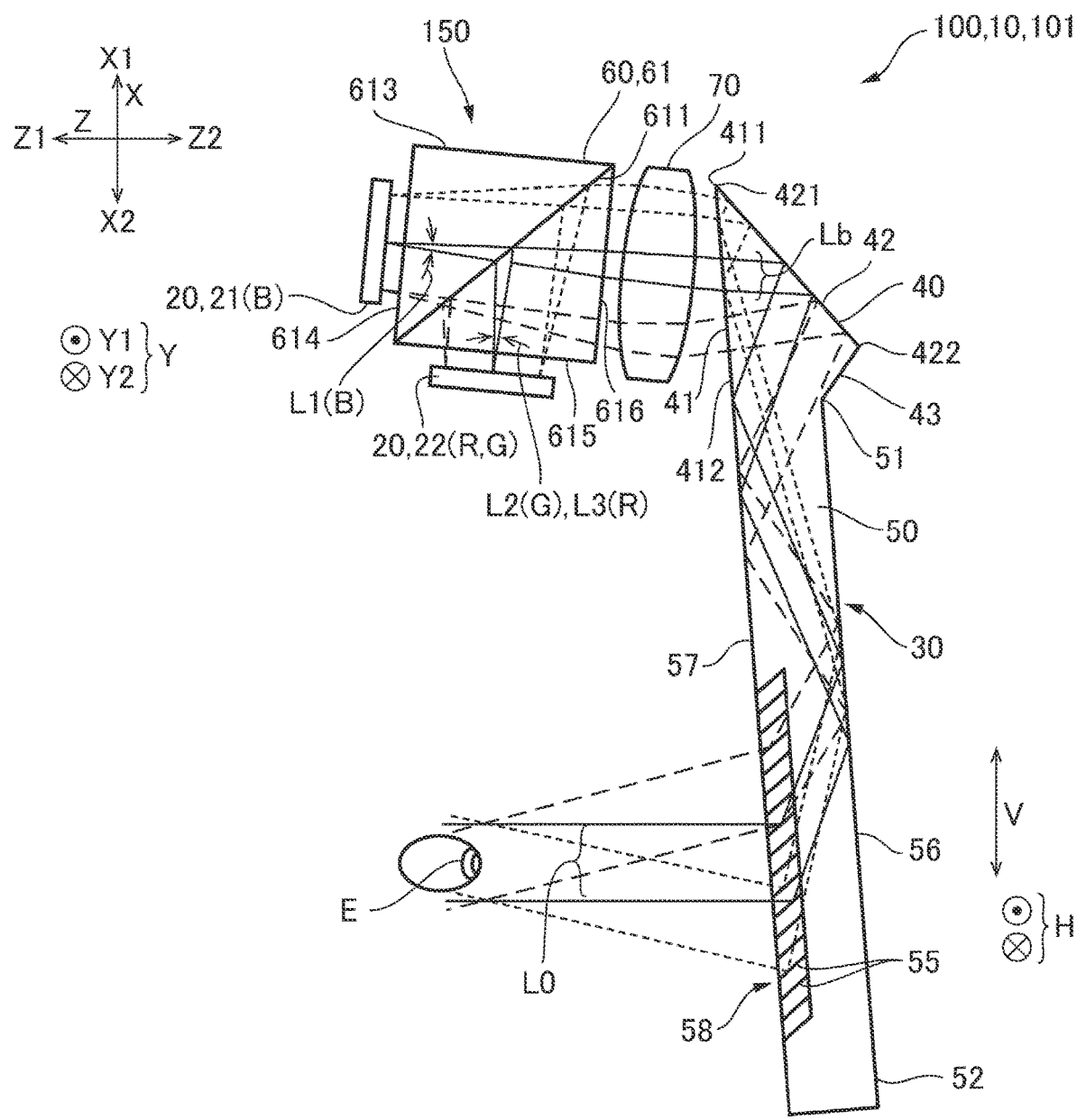
FIG. 17 is a side view of the display apparatus shown in FIG. 16 as viewed from the right side.

FIG. 16 is a schematic illustration of an example of the external appearance of a display apparatus 100 according to a seventh embodiment of the invention. FIG. 17 is a side view of the display apparatus 100 shown in FIG. 16 as viewed from the right side. The display apparatus 100 shown in FIG. 1 has the display panels 20 and the combining optical system 60 (dichroic prism 61) located near the viewer's ears and guides the combined light Lb from the ears toward the nose. In contrast, in this embodiment, as shown in FIGS. 16 and 17, the display panels 20, the combining optical system 60 (dichroic prism 61), and the projection lens system 70 are located above the eyes E, and the light guide section 50 extends in the direction from top to bottom. Accordingly, the combined light Lb is guided in the direction from top to bottom and is output toward the eyes E. Thus, in this embodiment, the top/bottom direction corresponds to the first direction X, the front/rear direction corresponds to the second direction Z, and the left/right direction corresponds to the third direction Y. The one side X1 in the first direction X (the side toward which the one end 51 of the light guide section 50 is oriented) corresponds to the top side, whereas the other side X2 in the first direction X (the side toward which the other end 52 of the light guide section 50 is oriented) corresponds to the bottom side. The vertical direction V of the image corresponds to the first direction X, whereas the horizontal direction H of the image corresponds to the third direction Y.

In the display unit 101 of the thus-configured display apparatus 100, color light L is emitted from each pixel of the display panels 20. After the dichroic prism 61 combines the individual colors of light, the combined light Lb passes through the entrance section 40 and enters the light guide section 50. The combined light Lb then travels through the light guide section 50 from the one end 51 side toward the other end 52 side in the first direction X while being reflected between the first surface 56 and the second surface 57 opposite each other in the second direction Z and is output from the exit section 58 toward the one side Z1 in the second direction Z. Thus, the viewer can perceive an image, with the vertical direction V being parallel to the first direction X and the horizontal direction H being parallel to the third direction Y.

Eighth Embodiment

Figure 18:
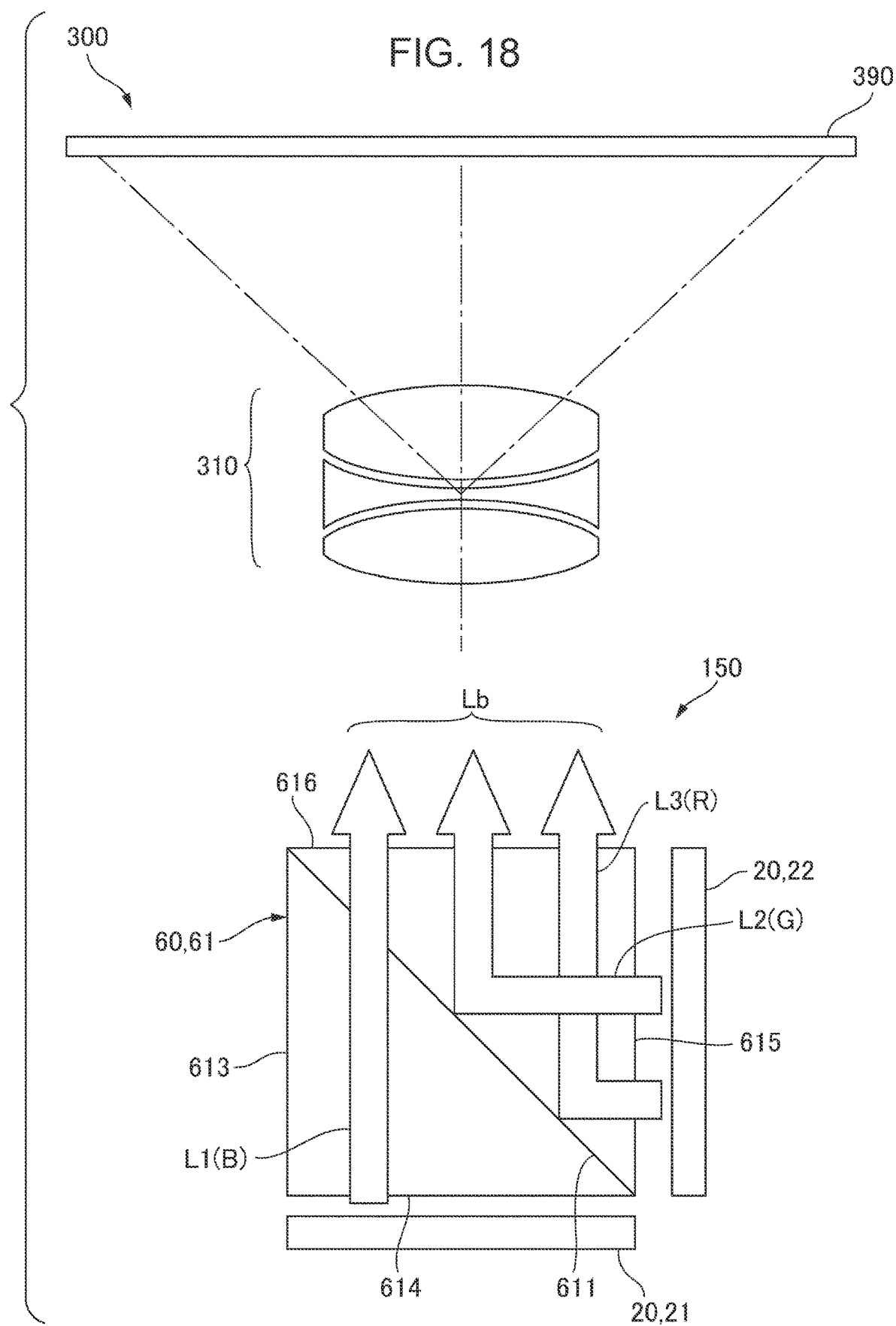
FIG. 18 is an illustration of a display apparatus according to an eighth embodiment of the invention.

FIG. 18 is an illustration of a display apparatus 300 according to an eighth embodiment of the invention. Although the optical device 150 used in each of the display units 10 of the head-mounted display apparatus 100 has been mainly described in the first to sixth embodiments, the optical device 150, as shown in FIG. 18, may be used in a projection display apparatus 300, which is also termed a projector. The display apparatus 300 includes a projection optical system 310 that projects a magnified image of the combined light Lb output from the combining optical system 60 onto a projection medium 390 such as a screen.

Ninth Embodiment

Although the first display panel 21 and the second display panel 22 have the same size in the embodiments described above, the second display panel 22 may have a larger size than the first display panel 21. In this case, the second pixels 27 (second light-emitting elements 270) and the third pixels 28 (third light-emitting elements 280) formed on the second display panel 22 can have a larger size than the first pixels 26 (first light-emitting elements 260) formed on the first display panel 21. This improves the luminance of the second color light L2 and the third color light L3 without applying a considerable load to the second light-emitting elements 270 and the third light-emitting elements 280.

Tenth Embodiment

Although the first light-emitting elements 260, the second light-emitting elements 270, and the third light-emitting elements 280 emit different colors of light in the embodiments described above, white light emitted from the first light-emitting elements 260, the second light-emitting elements 270, and the third light-emitting elements 280 may be colored through color filters provided for the first pixels 26, the second pixels 27, and the third pixels 28 to output the individual colors of light.

Other Embodiments

Although the embodiments described above illustrate the use of top-emitting organic electroluminescent elements that emit color light in a direction away from the substrate 250 as the first light-emitting elements 260, the second light-emitting elements 270, and the third light-emitting elements 280, bottom-emitting organic electroluminescent elements that emit color light from the substrate 250 side may also be used.

Although the embodiments described above illustrate display panels 20 having organic electroluminescent elements as light-emitting elements in individual pixels, the invention may also be applied to display panels having other light-emitting elements such as light-emitting diodes.

The entire disclosure of Japanese Patent Application No. 2017-109013 filed Jun. 1, 2017 is expressly incorporated by reference herein.

What is claimed is:

1. An optical device comprising:
a first display panel having a plurality of first pixels on a first substrate, each including a first light-emitting element, wherein the first display panel emits first color light from each of the plurality of first pixels;
a second display panel having a plurality of second pixels on a second substrate that is separated from the first substrate, each including a second light-emitting element, and a plurality of third pixels, each including a third light-emitting element, wherein the second display panel emits second color light having a different wavelength range from the first color light from each of the plurality of second pixels and emits third color light having a different wavelength range from the first color light and the second color light from each of the plurality of third pixels; and
a combining optical system that combines the light emitted from the first display panel and the light emitted from the second display panel.

2. The optical device according to claim 1, wherein the first light-emitting elements, the second light-emitting elements, and the third light-emitting elements are organic electroluminescent elements.

3. The optical device according to claim 2, wherein the first color light has a shorter peak wavelength than the second color light and the third color light.

4. The optical device according to claim 2, wherein the first light-emitting elements emit light via one of a singlet exciton and a triplet exciton, and the second light-emitting elements and the third light-emitting elements emit light via the other exciton.

5. The optical device according to claim 2, wherein a difference in peak wavelength between the second color light and the third color light is smaller than a difference in peak wavelength between the first color light and the second color light and a difference in peak wavelength between the first color light and the third color light.

6. The optical device according to claim 1, wherein the combining optical system includes a dichroic mirror that transmits the first color light and that reflects the second color light and the third color light.

7. The optical device according to claim 1, wherein the combining optical system includes a dichroic mirror that reflects the first color light and that transmits the second color light and the third color light.

8. The optical device according to claim 1, wherein the combining optical system includes a first dichroic mirror that reflects the first color light and that transmits the second color light and the third color light and a second dichroic mirror that transmits the first color light and that reflects the second color light and the third color light.

9. The optical device according to claim 1, wherein the second pixels and the third pixels have a larger size than the first pixels.

10. A display apparatus comprising:
the optical device according to claim 1; and
a light guide system that guides the light output from the combining optical system and that outputs the light toward a surface of a viewer.

11. A display apparatus comprising:
the optical device according to claim 2; and
a light guide system that guides the light output from the combining optical system and that outputs the light toward a surface of a viewer.

12. A display apparatus comprising:
the optical device according to claim 3; and
a light guide system that guides the light output from the combining optical system and that outputs the light toward a surface of a viewer.

13. A display apparatus comprising:
the optical device according to claim 4; and
a light guide system that guides the light output from the combining optical system and that outputs the light toward a surface of a viewer.

14. A display apparatus comprising:
the optical device according to claim 5; and
a light guide system that guides the light output from the combining optical system and that outputs the light toward a surface of a viewer.

15. A display apparatus comprising:
the optical device according to claim 6; and
a light guide system that guides the light output from the combining optical system and that outputs the light toward a surface of a viewer.

16. A display apparatus comprising:
the optical device according to claim 7; and
a light guide system that guides the light output from the combining optical system and that outputs the light toward a surface of a viewer.

17. A display apparatus comprising:
the optical device according to claim 8; and
a light guide system that guides the light output from the combining optical system and that outputs the light toward a surface of a viewer.

18. A display apparatus comprising:
the optical device according to claim 9; and
a light guide system that guides the light output from the combining optical system and that outputs the light toward a surface of a viewer.

19. A display apparatus comprising:
the optical device according to claim 1; and
a projection optical system that projects the light output from the combining optical system.

20. A display apparatus comprising:
the optical device according to claim 2; and
a projection optical system that projects the light output from the combining optical system.

* * * * *